United States Patent
Chen et al.

(10) Patent No.: US 11,570,765 B2
(45) Date of Patent: Jan. 31, 2023

(54) REMAINING MINIMUM SYSTEM INFORMATION RECEPTION IN 5G WIRELESS COMMUNICATION SYSTEM

(71) Applicant: MEDIATEK SINGAPORE PTE. LTD., Singapore (SG)

(72) Inventors: Tao Chen, Beijing (CN); Pei-Kai Liao, Hsinchu (TW)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 134 days.

(21) Appl. No.: 16/761,119

(22) PCT Filed: Nov. 19, 2018

(86) PCT No.: PCT/CN2018/116161
§ 371 (c)(1),
(2) Date: May 1, 2020

(87) PCT Pub. No.: WO2019/096298
PCT Pub. Date: May 23, 2019

(65) Prior Publication Data
US 2020/0275420 A1  Aug. 27, 2020

(30) Foreign Application Priority Data

Nov. 17, 2017 (WO) ............... PCT/CN2017/111682

(51) Int. Cl.
*H04W 72/04* (2009.01)
*H04W 48/12* (2009.01)

(52) U.S. Cl.
CPC ......... *H04W 72/042* (2013.01); *H04W 48/12* (2013.01)

(58) Field of Classification Search
CPC .... H04L 5/0023; H04L 5/0048; H04W 48/12; H04W 72/0406
See application file for complete search history.

(56) References Cited

U.S. PATENT DOCUMENTS

2011/0261769 A1  10/2011  Ji et al.
2016/0234735 A1  8/2016  Kubota et al.
(Continued)

FOREIGN PATENT DOCUMENTS

| CN | 103999528 A | 8/2014 |
|---|---|---|
| CN | 105723639 A | 6/2016 |
| WO | WO 2017/188664 A1 | 11/2017 |

OTHER PUBLICATIONS

International Search Report and Written Opinion dated Feb. 25, 2019 in PCT/CN2018/116161 filed on Nov. 19, 2018.
(Continued)

*Primary Examiner* — Ayaz R Sheikh
*Assistant Examiner* — Debebe A Asefa
(74) *Attorney, Agent, or Firm* — Oblon, McClelland, Maier & Neustadt, L.L.P.

(57) ABSTRACT

Aspects of the disclosure provide a method for remaining minimum system information (RMSI) reception. The method can include receiving a PBCH carrying a beam index (SBI) and indicating configuration information of a sequence of RMSI PDCCH monitoring occasions. The PBCH is carried in an SS block of an SS block burst set. The configuration information indicates an RMSI offset (D) between a timing reference and a slot carrying the RMSI PDCCH monitoring occasion at the beginning of the sequence of the RMSI PDCCH monitoring occasions, and an RMSI interval (T) between two RMSI PDCCH monitoring occasions in the sequence of RMSI PDCCH monitoring occasions. The method further includes determining a timing of a first RMSI PDCCH monitoring occasion in the sequence of RMSI PDCCH monitoring occasion according to the SBI and the configuration information.

26 Claims, 13 Drawing Sheets

(56) References Cited

U.S. PATENT DOCUMENTS

| | | | |
|---|---|---|---|
| 2016/0353420 A1 | 12/2016 | You et al. | |
| 2016/0353433 A1 | 12/2016 | Roh et al. | |
| 2017/0251443 A1 | 8/2017 | Shin et al. | |
| 2017/0251455 A1 | 8/2017 | Shin et al. | |
| 2018/0324753 A1* | 11/2018 | Islam | H04W 48/14 |
| 2019/0356524 A1* | 11/2019 | Yi | H04B 7/0695 |
| 2020/0288417 A1* | 9/2020 | Harada | H04W 72/044 |

OTHER PUBLICATIONS

Chinese Office Action dated Oct. 19, 2022 in Chinese Patent Application No. 201880034044.2 filed Nov. 19, 2018, 7 pages.

* cited by examiner

| CASES | SUBCARRIER SPACING (kHz) | FIRST SYMBOL INDEXES IN A HALF FRAME WINDOW | f<=3 GHz | 3 GHz<f<=6 GHz | 6 GHz <f |
|---|---|---|---|---|---|
| A | 15 | {2,8} + 14n | n = 0,1 | n = 0,1,2,3 | |
| B | 30 | {4,8,16,20}+28n | n = 0 | n = 0,1 | |
| C | 30 | {2,8} + 14n | n = 0,1 | n = 0,1,2,3 | |
| D | 120 | {4,8,16,20}+ 28n | | | n = 0, 1, 2, 3, 5, 6, 7, 8, 10, 11, 12, 13, 15, 16, 17, 18 |
| E | 240 | {8, 12, 16, 20, 32, 36, 40, 44} + 56n | | | n = 0, 1, 2, 3, 5, 6, 7, 8, |

FIG. 5

REMAINING MINIMUM SYSTEM INFORMATION RECEPTION IN 5G WIRELESS COMMUNICATION SYSTEM

INCORPORATION BY REFERENCE

This present disclosure claims the benefit of International Application No. PCT/CN2017/111682, "Methods of Remaining Minimum System Information Reception" filed on Nov. 17, 2017, which is incorporated herein by reference in its entirety.

TECHNICAL FIELD

The present disclosure relates to wireless communications, and specifically relates to system information delivery in a wireless communication system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) is used in 5th generation (5G) wireless communication systems to increase system capacity. Beamforming schemes can be employed to focus transmitted and/or received signal in a desired direction to compensate for unfavorable path loss of high frequency signals. For example, a base station may perform a beam sweeping to cover a serving area.

SUMMARY

Aspects of the disclosure provide a method for remaining minimum system information (RMSI) reception. The method can include receiving a first synchronization signal block (SS block) from a base station at a user equipment (UE) in a wireless communication system, wherein the first SS block includes a physical broadcast channel (PBCH) carrying a beam index (SBI), the PBCH indicates configuration information of a sequence of RMSI physical downlink control channel (PDCCH) monitoring occasions, each of the RMSI PDCCH monitoring occasions is associated with one of a sequence of SS blocks in an SS block burst set that includes the first SS block, and the configuration information of RMSI PDCCH monitoring occasion indicates an RMSI offset (D) between a timing reference and a slot carrying the RMSI PDCCH monitoring occasion at the beginning of the sequence of the RMSI PDCCH monitoring occasions, and an RMSI interval (T) between two RMSI PDCCH monitoring occasions in the sequence of RMSI PDCCH monitoring occasions, decoding the PBCH of the first SS block to obtain the SBI of the first SS block, the RMSI offset (D), and the RMSI interval (T), and determining a timing, with respect to the timing reference, of a first RMSI PDCCH monitoring occasion in the sequence of RMSI PDCCH monitoring occasions based on the obtained SBI of the first SS block, the RMSI offset (D), and the RMSI interval (T) according to the following equation:

the timing of the first RMSI PDCCH monitoring occassion=$D+SBI*T$.

In an embodiment, the timing reference is a starting of each of a sequence of frames transmitted with a period. In an embodiment, the method further includes monitoring an RMSI control resource set (CORESET) carrying an RMSI PDCCH during the first RMSI PDCCH monitoring occasion according to the determined timing of the first RMSI PDCCH monitoring occasion to detect the RMSI PDCCH, the RMSI PDCCH carrying scheduling information of a physical downlink shared channel (PDSCH) carrying RMSI, and decoding the RMSI PDSCH according to the scheduling information to obtain the RMSI.

In an embodiment, the method further includes determining the timing of the first RMSI PDCCH monitoring occasion with respect to the timing reference according to the following equation:

the timing of the first RMSI PDCCH monitoring occasion in slot=$D*2^\mu + SBI*T*2^\mu$, wherein the RMSI offset (D) and the RMSI interval (T) are provided as a number of ms, and μ is an index of a numerology for transmission of RMSI PDCCHs carried in the RMSI PDCCH monitoring occasions.

In an embodiment, the method further includes determining the timing of the first RMSI PDCCH monitoring occasion with respect to a start time of a frame containing the RMSI PDCCH monitoring occasion according to the following equation:

the timing of the first RMSI PDCCH monitoring occasion in slot within the frame=$(D*2^\mu + SBI*T*2^\mu) \bmod N_{slot}^{frame,\mu}$, wherein the RMSI offset (D) and the RMSI interval (T) are provided as a number of ms, and $N_{slot}^{frame,\mu}$ represents a number of slots in the frame corresponding to a numerology of index μ for transmission of RMSI PDCCHs carried in the RMSI PDCCH monitoring occasions.

In an example, the timing of the first RMSI PDCCH monitoring occasion with respect to the start time of the frame containing the RMSI PDCCH monitoring occasion is determined according to the following equations:

the timing of the first RMSI PDCCH monitoring occasion in slot within the frame $= (D*2^\mu + SBI*T') \bmod N_{slot}^{frame,\mu}$ $= (D*2^\mu + SBI) \bmod N_{slot}^{frame,\mu}$, $T' = 1$ slot, wherein the RMSI offset (D) is provided as a number of ms, the RMSI interval (T) lasts for a period of time equal to one slot corresponding to the numerology of index μ.

In an example, the sequence of RMSI physical downlink control channel (PDCCH) monitoring occasions each include an RMSI PDCCH. In an example, the RMSI interval (T) includes one or more slots corresponding to a numerology of the sequence of RMSI physical downlink control channel (PDCCH) monitoring occasions. In an example, the sequence of RMSI physical downlink control channel (PDCCH) monitoring occasions each include one or more slots corresponding to a numerology of the sequence of RMSI physical downlink control channel (PDCCH) monitoring occasions.

Aspects of the disclosure provide a second method for RMSI delivery. The second method can include transmitting a first SS block from a base station to a user equipment UE in a wireless communication system, wherein the first SS block includes a PBCH carrying a SBI, the PBCH indicates configuration information of a sequence of RMSI PDCCH monitoring occasions, each of the RMSI PDCCH monitoring occasions is associated with one of a sequence of SS blocks in an SS block burst set that includes the first SS block, and the configuration information of RMSI PDCCH monitoring occasions indicates an RMSI offset (D) between a timing reference and a slot carrying the RMSI PDCCH monitoring occasion at the beginning of the sequence of the RMSI PDCCH monitoring occasions, and an RMSI interval (T) between two RMSI PDCCH monitoring occasions in the sequence of RMSI PDCCH monitoring occasions.

Aspects of the disclosure provide a UE for RMSI reception. The UE can include circuitry configured to receive a first SS block from a base station in a wireless communication system, wherein the first SS block includes a PBCH carrying a SBI, the PBCH indicates configuration information of a sequence of RMSI PDCCH monitoring occasions, each of the RMSI PDCCH monitoring occasions is associated with one of a sequence of SS blocks in an SS block burst set that includes the first SS block, and the configuration information of RMSI PDCCH monitoring occasion indicates an RMSI offset (D) between a timing reference and a slot carrying the RMSI PDCCH monitoring occasion at the beginning of the sequence of the RMSI PDCCH monitoring occasions, and an RMSI interval (T) between two RMSI PDCCH monitoring occasions in the sequence of RMSI PDCCH monitoring occasions, decode the PBCH of the first SS block to obtain the SBI of the first SS block, the RMSI offset (D), and the RMSI interval (T), and determine a timing, with respect to the timing reference, of a first RMSI PDCCH monitoring occasion in the sequence of RMSI PDCCH monitoring occasions based on the obtained SBI of the first SS block, the RMSI offset (D), and the RMSI interval (T) according to the following equation:

$$\text{the timing of the first RMSI PDCCH monitoring occassion} = D + SBI * T.$$

Aspects of the disclosure provide a third method. The method includes receiving a first synchronization signal block (SS block) from a base station at a user equipment (UE) in a wireless communication system. The first SS block includes a physical broadcast channel (PBCH) carrying a beam index (SBI). The PBCH indicates configuration information of a sequence of remaining minimum system information (RMSI) physical downlink control channel (PDCCH) monitoring occasions. Each of the RMSI PDCCH monitoring occasions is associated with one of a sequence of SS blocks in an SS block burst set that includes the first SS block, and each of the RMSI PDCCH monitoring occasions has an index corresponding to a beam index of the respective SS block in the SS block burst set. The configuration information of RMSI PDCCH monitoring occasion indicates an RMSI offset (D) between a timing reference and a slot carrying the RMSI PDCCH monitoring occasion at the beginning of the sequence of the RMSI PDCCH monitoring occasions, and an RMSI interval (T) between two consecutive even-indexed or odd-indexed RMSI PDCCH monitoring occasions in the sequence of RMSI PDCCH monitoring occasions. The third method further includes decoding the PBCH of the first SS block to obtain the SBI of the first SS block, the RMSI offset (D), and the RMSI interval (T), and determining a timing with respect to the timing reference of a first RMSI PDCCH monitoring occasion in the sequence of RMSI PDCCH monitoring occasions based on the obtained SBI of the first SS block, the RMSI offset (D), and the RMSI interval (T) according to the following equation:

$$\text{the timing of the first RMSI PDCCH monitoring occasion} = D + \lfloor SBI * (1/2) \rfloor * T.$$

BRIEF DESCRIPTION OF THE DRAWINGS

Various embodiments of this disclosure that are proposed as examples will be described in detail with reference to the following figures, wherein like numerals reference like elements, and wherein:

FIG. 5 shows a table including example SS block configurations within a 5 ms half frame time window according to an embodiment of the disclosure;

DETAILED DESCRIPTION OF EMBODIMENTS

Figure 1:
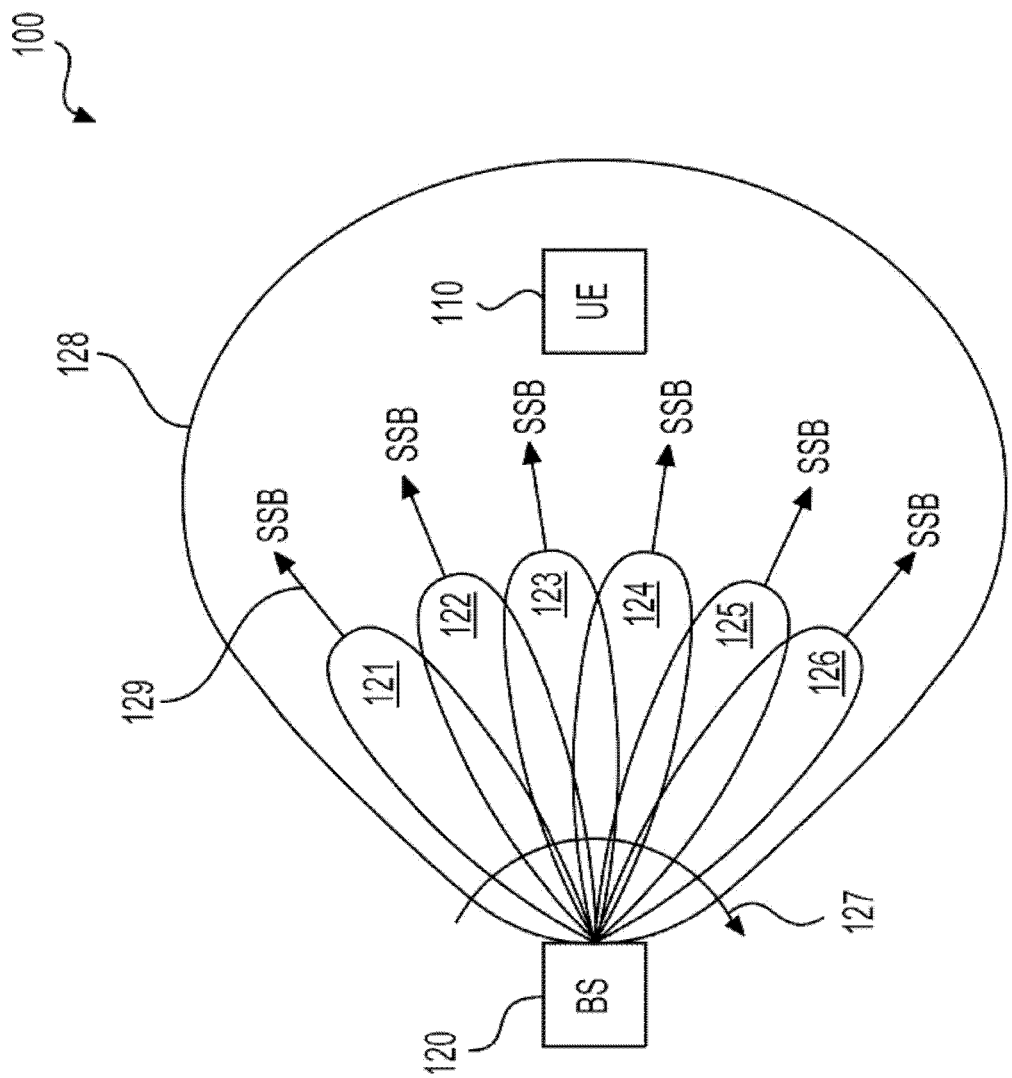
FIG. 1 shows a beam-based wireless communication system according to an embodiment of the disclosure.

FIG. 1 shows a beam-based wireless communication system 100 according to an embodiment of the disclosure. The system 100 can include a user equipment (UE) 110 and a base station (BS) 120. In some examples, the system 100 employs 5th generation (5G) wireless communication technologies developed by the 3rd Generation Partnership Project (3GPP). In some examples, the system 100 employs beam-based technologies other than technologies developed by 3GPP.

In some examples, millimeter Wave (mm-Wave) frequency bands and beamforming technologies are employed in the system 100. Accordingly, the UE 110 and the BS 120 can perform beamformed transmission or reception. In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

The BS 120 can be a base station implementing a gNB node as specified in 5G new radio (NR) air interface standards developed by 3GPP. The BS 120 can be configured to control one or more antenna arrays to form directional Tx or Rx beams for transmitting or receiving wireless signals. In some examples, different sets of antenna arrays are distributed at different locations to cover different serving areas. Each such set of antenna arrays can be referred to as a transmission reception point (TRP).

In FIG. 1 example, the BS 120 can control a TRP to form Tx beams 121-126 to cover a cell 128. The beams 121-126 can be generated towards different directions. The beams 121-126 can be generated simultaneously or in different time intervals in different examples. In one example, the BS 120 is configured to perform a beam sweeping 127 to transmit downlink L1/L2 control channel and/or data channel signals. During the beam sweeping 127, Tx beams 121-126 towards different directions can be successively formed in a time division multiplex (TDM) manner to cover the cell 128. During each time interval for transmission of one of the beams 121-126, a set of L1/L2 control channel data and/or data channel data can be transmitted with the respective Tx beam. The beam sweeping 127 can be performed repeatedly with a certain periodicity. In alternative examples, the beams 121-126 may be generated in a way other than performing a beam sweeping. For example, multiple beams towards different directions may be generated at a same time. In other examples, different from FIG. 1 example where the beams 121-126 are generated horizontally, the BS 120 can generate beams towards different horizontal or vertical directions. In an example, the maximum number of beams generated from a TRP can be 64.

In one example, the beams 121-126 of the cell 128 can be associated with synchronization signal blocks (SS blocks) (also referred to as SS/PBCH blocks). For example, an SS block can include SSs (e.g., primary synchronization signal (PSS), secondary synchronization signal (SSS)) and a physical broadcast channel (PBCH) carried on several consecutive orthogonal frequency division multiplexing (OFDM) symbols in an OFDM based system. For example, the BS 120 may periodically transmit a sequence of SS blocks (referred to as an SS block burst set). The SS block burst set may be transmitted by performing a beam sweeping. For example, each SS block of the SS block burst set is transmitted using one of the beams 121-126. The sequence of SS blocks may each carry an SS block index indicating a timing or location of each SS block among the sequence of SS blocks.

The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals. While only one UE 110 is shown in FIG. 1, a plurality of UEs can be distributed within or outside of the cell 128, and served by the BS 120 or other BSs not shown in FIG. 1. In FIG. 1 example, the UE 110 is within the coverage of the cell 128.

The UE 110 can operate in radio resource control (RRC) connected mode, RRC inactive mode, or RRC idle mode. For example, when the UE 110 is operating in RRC connected mode, an RRC context is established and known to both the UE 110 and the BS 120. The RRC context includes parameters necessary for communication between the UE 110 and the BS 120. An identity of the UE 110, such as a cell radio network temporary identified (C-RNTI), can be used for signaling between the UE 110 and the BS 120.

When the UE 110 is operating in RRC idle mode, there is no RRC context established. The UE 110 does not belong to a specific cell. For example, no data transfer may take place. The UE 110 sleeps most of the time in order to save power, and wake up according to a paging cycle to monitor if a paging message is coming from network side of the system 100. Triggered by a paging message (e.g., system information updating, or a connection establishment request), the UE 110 may transfer from RRC idle mode to RRC connected mode. For example, the UE 110 can establish uplink synchronization, and an RRC context can be established in both the UE 110 and the BS 120.

When the UE 110 is operating in RRC inactive mode, RRC context is maintained by the UE 110 and the BS 120. However, similar to RRC idle mode, the UE 110 may be configured with discontinuous reception (DRX). For example, the UE 110 sleeps most of the time in order to save power, and wake up according to a paging cycle to monitor paging transmission. When triggered, the UE 110 can promptly transition from RRC inactive mode to RRC connected mode to transmit or receive data with fewer signaling operations than a transition from RRC idle mode to RRC connected mode.

In an embodiment, the BS 120 is configured to provide system information to UEs within the cell 128. The system information includes common (non-UE-specific) information that a UE needs in order to properly operate within the system 100. The system information is organized into different system information blocks (SIB) each including different types of system information. A first system information block, referred to as a master information block (MIB), includes minimum system information, and is carried in the PBCH. The MIB is periodically broadcast in the cell 128 along with the SS blocks (SSB) 129, for example, with a periodicity of 5 ms, 10 ms, 20 ms, 40 ms, 80 ms, or the like.

A second system information block, referred to as SIB 1, or remaining minimum system information (RMSI), includes system information that a UE needs to know before it can access the system 100. For example, SIB 1 includes information a UE needs in order to perform an initial random access. SIB 1 is periodically broadcast in the cell 128, for example, with a periodicity of 160 ms.

In addition to the MIB and SIB 1, there are other SIBs that include system information a UE does not need to know before accessing the system 100. These additional SIBs can be periodically broadcast similar to SIB 1, or can be transmitted on demand.

In an embodiment, RMSI or SIB 1 is provided by means of physical downlink shared channel (PDSCH) that is scheduled using a physical downlink control channel (PDCCH). A PDSCH carrying RMSI is referred to as a RMSI PDSCH. A PDCCH for scheduling an RMSI PDSCH is referred to as an RMSI PDCCH. For example, the RMSI PDCCH carries control information a UE needs to decode the RMSI PDSCH. The control information includes, for example, resource scheduling assignment and coding and modulation scheme for transmission or decoding of the RMSI PDSCH.

In addition, in the embodiment, PBCH is configured to provide configuration information for the RMSI PDCCH that schedules the RMSI PDSCH carrying the RMSI. For example, a set of time-frequency resource elements, referred to as control resource set (RMSI CORESET), can be configured for carrying the RMSI PDCCH. The PBCH can provide configuration information of the RMSI CORESET, such that a UE can monitor the respective RMSI CORESET to detect the RMSI PDCCH based on the provided configuration information. For example, the configuration information of the RMSI CORESET can include the size of the RMSI CORESET, a location of the RMSI CORESET within an OFDM resource grid, a search space associated with the RMSI CORESET, a numerology for transmission of the RMSI CORESET and respective RMSI PDSCH, and additional parameters.

Further, in the embodiment, RMSI PDCCH transmission or monitoring occasions are configured with time/frequency association to SS blocks. In one example, each of the RMSI PDCCH transmission or monitoring occasions can include an RMSI PDCCH that is associated with a respective SS block. For example, as described, an SS block burst set is periodically transmitted. SS blocks of one SS block burst set are transmitted along a set of beams transmitted in a beam sweeping. Accordingly, the RMSI PDCCH or corresponding RMSI CORESET can be transmitted with the beam corresponding to the respective associated SS block. When performing reception of RMSI, the UE 110 may first synchronize with an SS block and subsequently proceeds to monitor an RMSI PDCCH within a RMSI CORESET corresponding to the respective associated SS block. For example, based on the association relationship, and configuration information provided by the respective PBCH in the respective SS block, the transmission occasion of the RMSI CORESET can be determined.

In one example, the UE 110 performs a cell search process to acquire system information. For example, the UE 110 is powered on or initially entering the coverage of the system 100. The UE 110 performs the cell search to find a cell, and subsequently perform a random access to set up a connection. In an alternative example, the UE 110 is in an idle or inactive state while moving within the system 100 and entering the cell 128. The UE 110 may similarly perform the cell search process to acquire the system information from the new cell 128, and subsequently perform a random access to set up a connection within the new cell 128.

For example, during the cell search process, the UE 110 first synchronizes to the system 100 by receiving PSS and SSS of an SS block. The UE 110 subsequently decodes the PBCH of the SS block to obtain a MIB. Based on configuration information provided in the MIB, the UE 110 may detect an RMSI PDCCH and obtain scheduling information of an RMSI PDSCH. Thereafter, RMSI can be acquired by decoding the RMSI PDSCH. As a result, the system information including the MIB and the RMSI can be obtained. The RMSI may carry configuration information needed for performing a random access to set up a connection to the BS 120.

Figure 2:
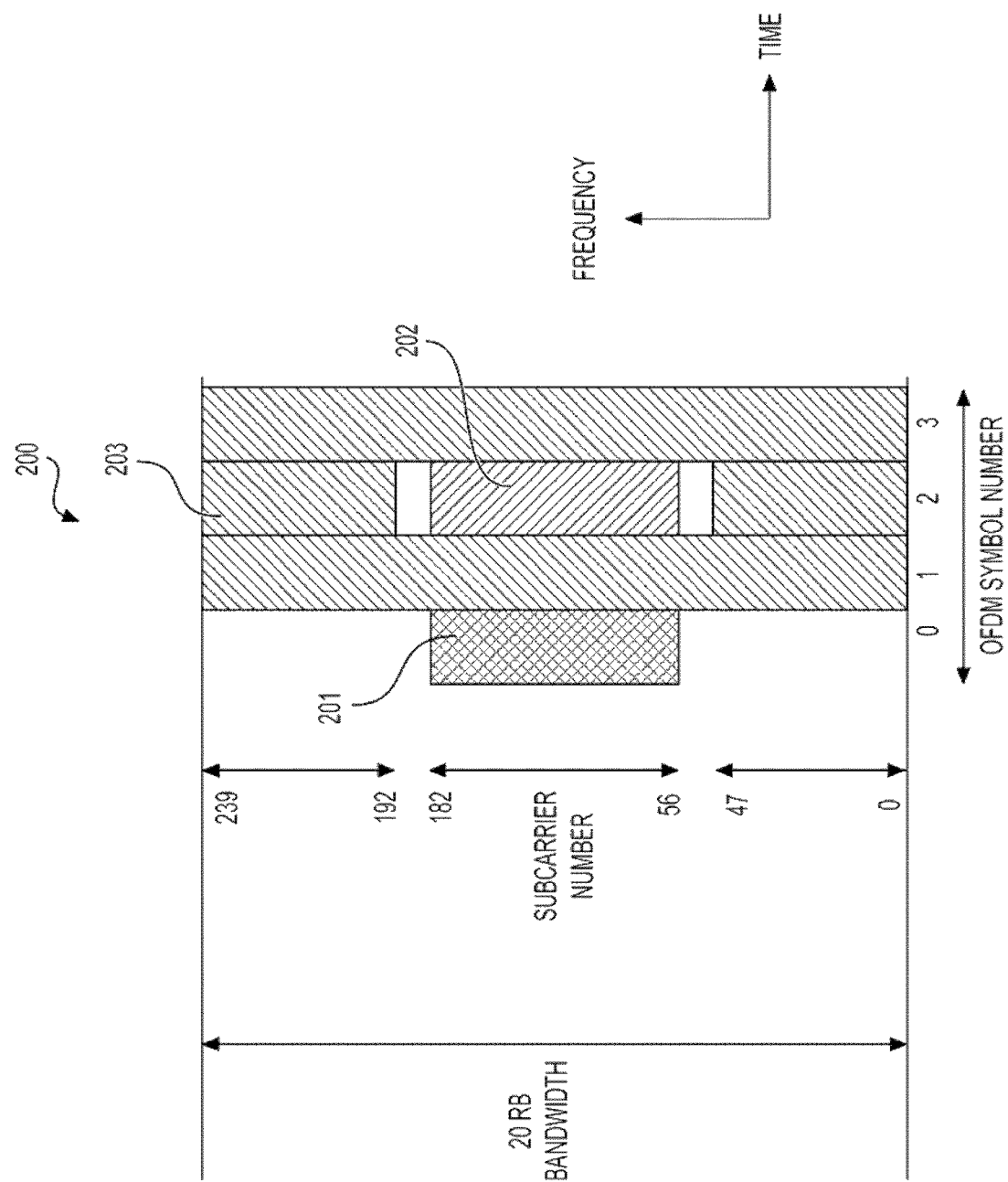
FIG. 2 shows an example of a synchronization signal block (SS block) used in the system according to an embodiment of the disclosure.

FIG. 2 shows an example of an SS block 200 used in the system 100 according to an embodiment of the disclosure. The SS block 200 can include a PSS 201, an SSS 202, and a PBCH 203(represented with shaded areas designated with numbers of 201, 202, and 203). Those signals can be carried in REs on a time-frequency resource grid as shown in FIG. 2. In addition, the SS block 200 can carry DMRSs (not shown) in a subset of REs in the shaded area 203. The REs carrying DMRSs are not used for carrying PBCH signals in one example.

In one example, the SS block 200 can be distributed over 4 OFDM symbols in time domain and occupy a 20 resource block (RB) bandwidth in frequency domain. As shown in FIG. 2, the 4 OFDM symbols are numbered from 0 to 3, while the 20 RB bandwidth includes 240 subcarriers numbered from 0 to 239. Specifically, the PSS 201 can occupy REs at symbol 0 and subcarriers 56-182. The SSS 202 can occupy REs at symbol 2 and subcarriers 56-182. The PBCH 203 can be located at symbols 1-3 occupying 20 RBs at symbols 1 and 3, and 8 RBs (96 subcarriers) at symbol 2.

In one example, the SS block 200 is configured to carry bits of an SS block index by using the DMRSs and the PBCH 203. In one example, by decoding the PSS 201 and the SSS 202, a physical layer cell identification (ID) can be determined. The cell ID indicates which cell the SS block 200 is associated with.

It is noted that SS blocks in various examples may have structures different from the FIG. 2 example. For example, number of OFDM symbols in an SS block may be fewer or more than four. OFDM symbols carrying SSs and OFDM symbols carrying PBCH may be arranged in different order in time domain. Bandwidth of an SS block may be different from that of FIG. 2 example. REs assigned for SSs or PBCH may by more or less than that in FIG. 2 example.

Figure 3:
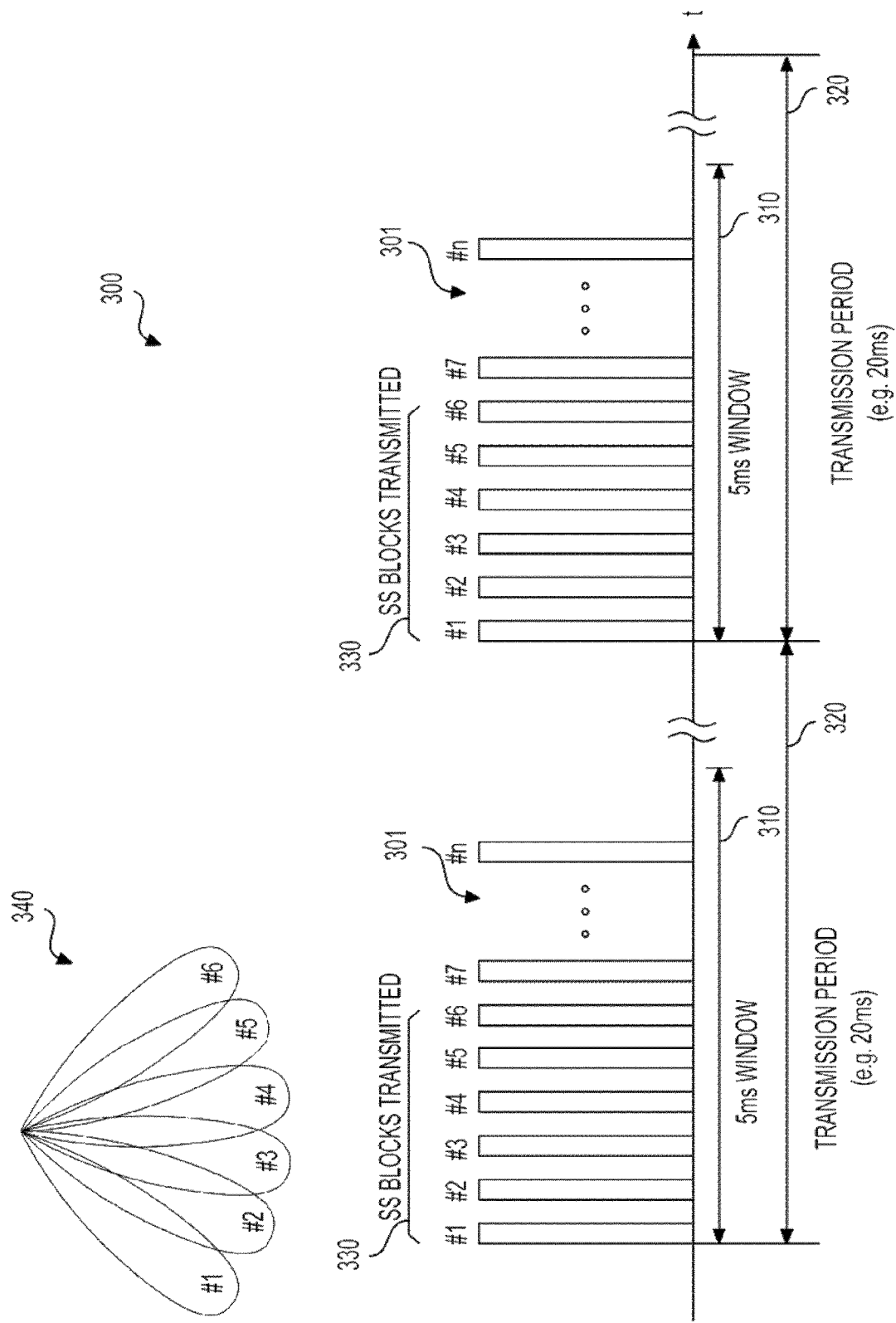
FIG. 3 shows an example SS block transmission configuration according to an embodiment of the disclosure.

FIG. 3 shows an example SS block transmission configuration 300 according to an embodiment of the disclosure. According to the configuration 300, a sequence 301 of SS blocks, referred to as SS block burst set 301, can be transmitted with a transmission period 320 (e.g., 5, 10, 20, 40, 80, or 160 ms) in a sequence of radio frames. The SS block burst set 301 can be confined within a half frame transmission window 310 (e.g., 5 ms). Each configured SS block can have an SS block index (e.g., from #1 to #n). The SS blocks of the SS block set 301 are configured as candidate SS blocks, but may not be used for actual transmissions of SS blocks.

For example, a cell 340 employs 6 beams from #1 to #6 to cover a serving area and transmits SS blocks based on the configuration 300. Accordingly, only a subset 330 of the SS block set 301 is transmitted. For example, the transmitted SS blocks 330 may include the first six candidate SS blocks of the SS block set 301 each corresponding to one of the beams #1-#6. Resources corresponding to other candidate SS blocks from #7 to #n can be used for transmission of data other than SS blocks.

Figure 4:
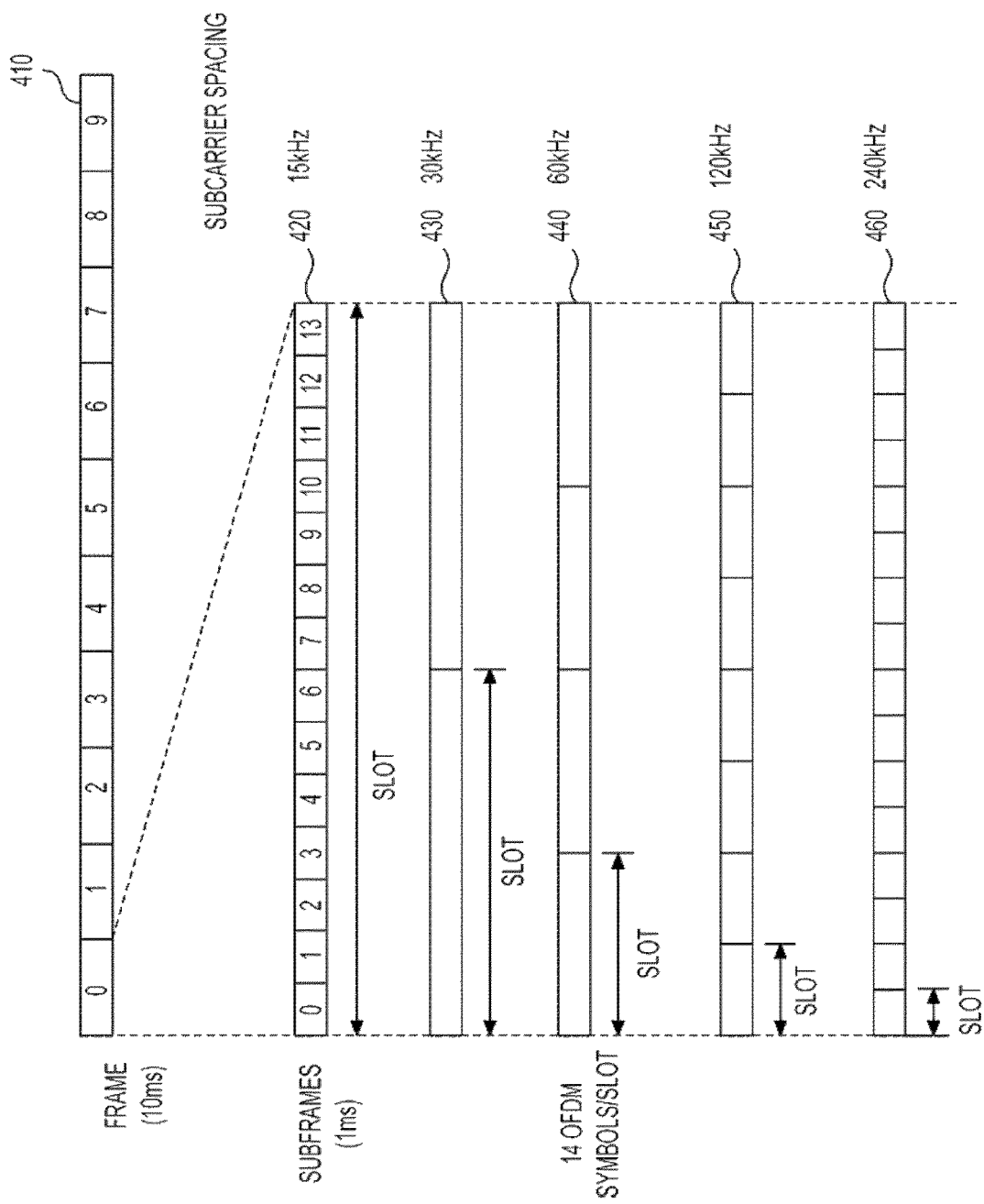
FIG. 4 shows example frame structures used in the system corresponding to different numerologies or subcarrier spacings according to an embodiment of the disclosure.

FIG. 4 shows example frame structures used in the system 100 corresponding to different numerologies or subcarrier spacings according to an embodiment of the disclosure. A radio frame 410 can last for 10 ms and include 10 subframes that each last for 1 ms. Corresponding to different numerologies and respective subcarrier spacings, a subframe may include different number of slots. For example, for a subcarrier spacing of 15 kHz, 30 kHz, 60 kHz, 120 kHz, or 240 kHz, a respective subframe 420-460 can include 1, 2, 4, 8, or 16 slots, respectively. Each slot may include 14 OFDM symbols in one example. In alternative examples, different frame structures may be employed. For example, a slot may include 7 or 28 OFDM symbols.

FIG. 5 shows a table 500 including example SS block configurations within a 5 ms half frame time window according to an embodiment of the disclosure. The table 500 shows five case A-case E of SS block configurations in five rows of the table 500. The five case A-case E correspond to different subcarrier spacing configurations of a cell. For each case, indexes of first symbols in each SS block within a half frame (e.g., 5 ms) are specified.

For example, in case A with 15 kHz subcarrier spacing, the first symbols of the candidate SS blocks have symbol indexes of $\{2, 8\}+14$ n. For carrier frequencies smaller than or equal to 3 GHz, n=0, 1, corresponding to a total number of L=4 SS blocks. Accordingly, the 4 candidate SS blocks can have SS block indexes in an ascending order in time from 0 to 3. For carrier frequencies larger than 3 GHz and smaller than or equal to 6 GHz, n=0, 1, 2, 3, corresponding to a total number of L=8 candidate SS blocks. Accordingly, the 8 candidate SS blocks can have SS block indexes in an ascending order in time from 0 to 7.

For another example, in case D with 120 kHz subcarrier spacing, the first symbols of the candidate SS blocks have symbol indexes of {4, 8, 16, 20}+28 n. For carrier frequencies larger than 6 GHz, n=0, 1, 2, 3, 5, 6, 7, 8, 10, 11, 12, 13, 15, 16, 17, 18, corresponding to a total number of L=64 candidate SS blocks. Accordingly, the 64 candidate SS blocks can have SS block indexes in an ascending order in time from 0 to 63.

It is noted that SS block configurations different from that shown in FIG. 5 may be used in other examples.

Figure 6:
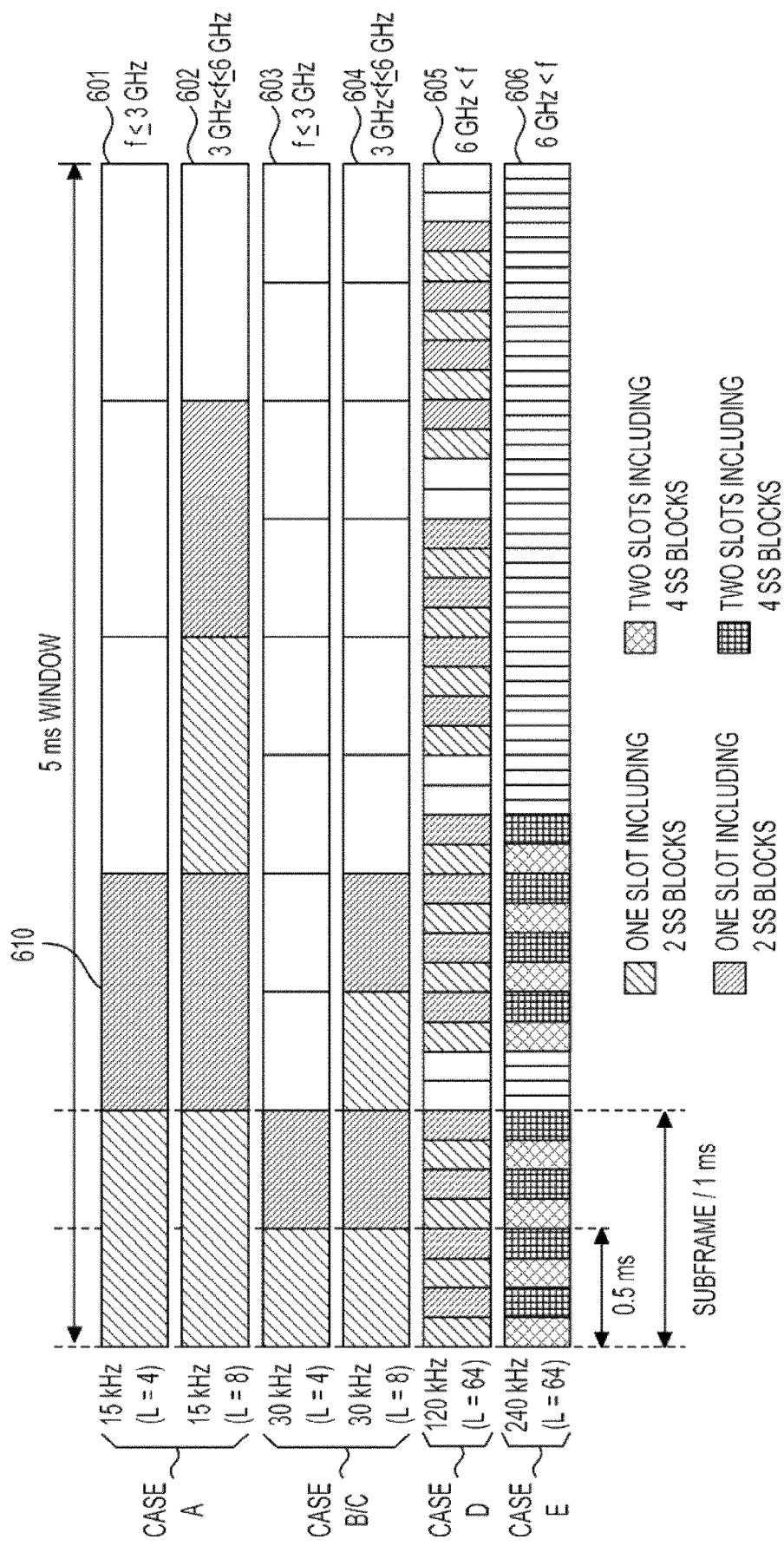
FIG. 6-FIG. 8 illustrate the SS block configurations of case A-case E in FIG. 5.
Figure 7:
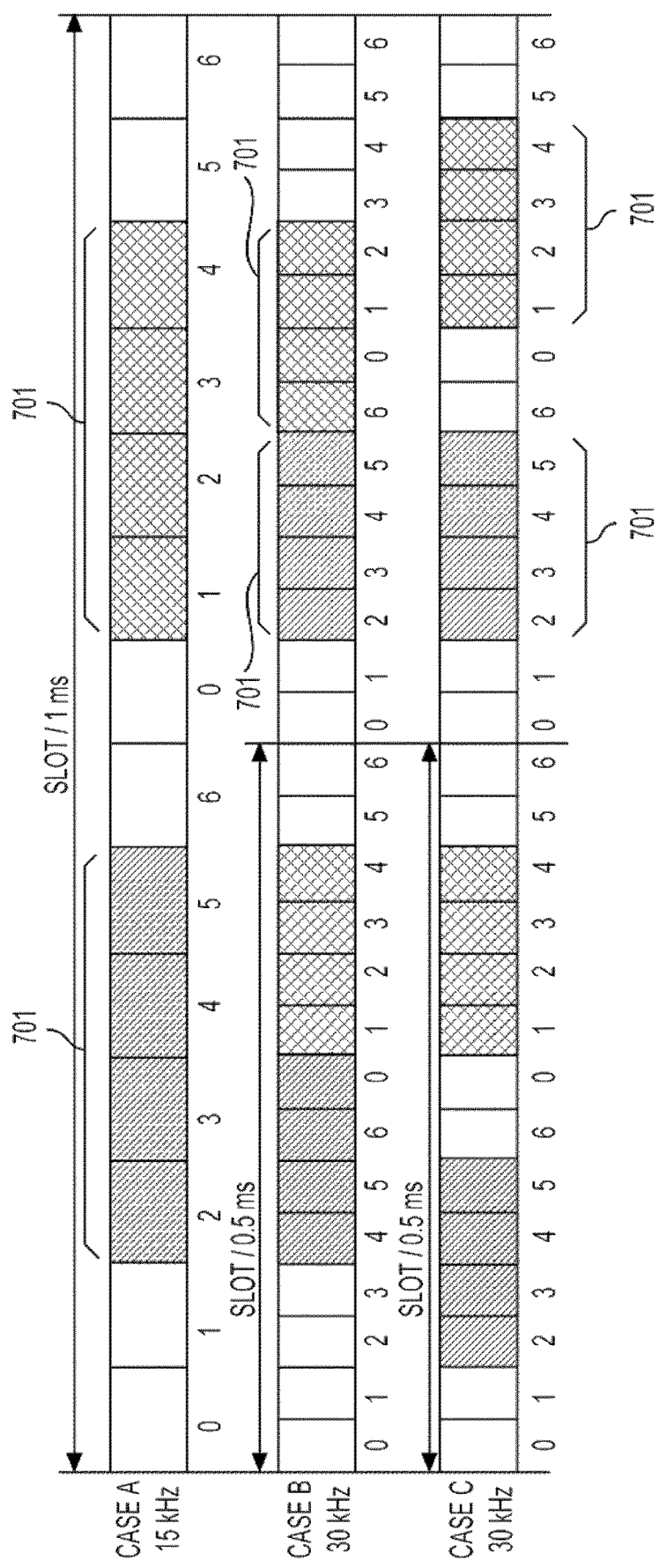
Figure 8:
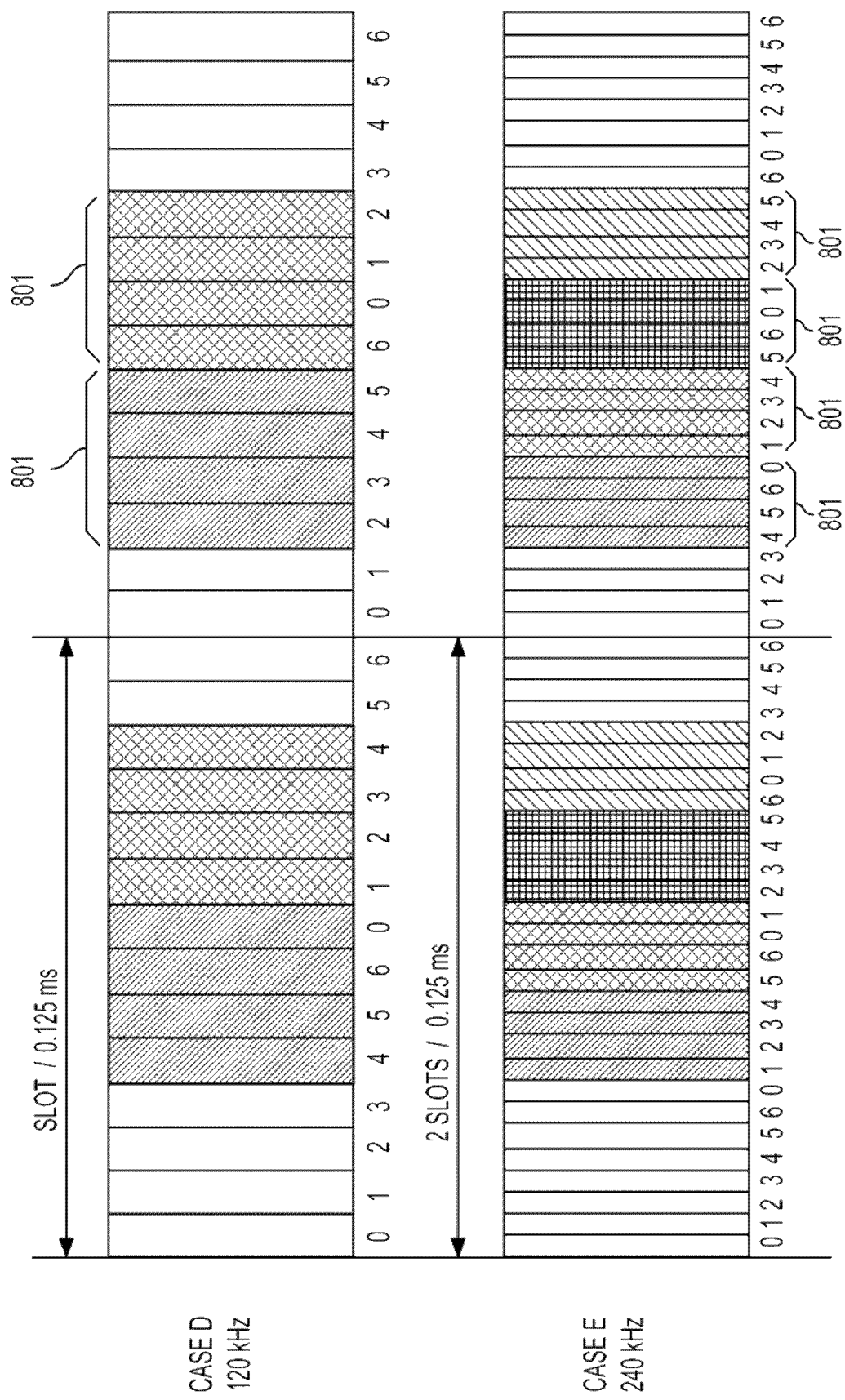

FIG. 6-FIG. 8 illustrate the SS block configurations of case A-case E in FIG. 5. Specifically, FIG. 6 shows six SS block configurations 601-606 corresponding to different combinations of subcarrier spacings and frequency bands. In each configuration 601-606, slots containing SS blocks within a half frame window are shown with shaded rectangles 610. FIG. 7 and FIG. 8 show zoomed-in views of how SS blocks 701 or 801 are distributed over sequences of symbols in time domain.

Figure 9:
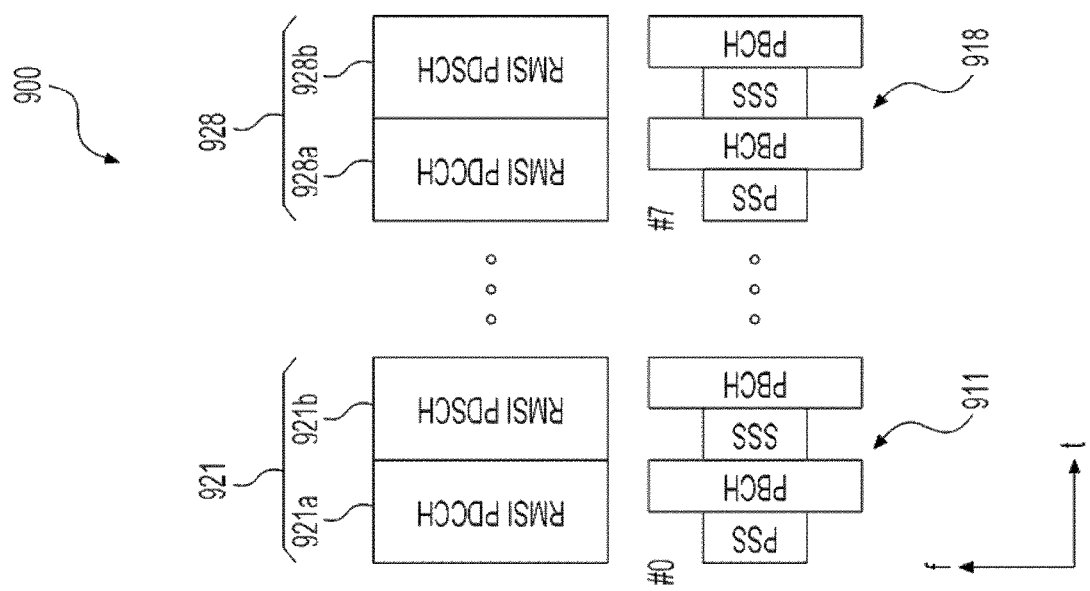
FIG. 9 shows an SS block and remaining minimum system information (RMSI) block multiplexing pattern according to an embodiment of the disclosure.

FIG. 9 shows an SS block and RMSI block multiplexing pattern 900 according to an embodiment of the disclosure. As shown, a sequence of SS blocks 911-918 belonging to an SS block burst set are transmitted with a beam sweeping. Each SS block 911-918 has a beam index from #0 to #7. A sequence of RMSI blocks 921-928 are frequency division multiplexed (FDMed) with the SS blocks 911-918. Each RMSI block 921-928 can include an RMSI control block 921a-928a representing a set of resource elements carrying an RMSI PDCCH, and an RMSI data block 921b-928b representing a set of resource elements carrying an RMSI PDSCH. Each RMSI block 921-928 is associated with and corresponding to a respective block. For example, each SS blocks 911-918 may occupy 4 OFDM symbols which are multiplexed with 2 symbols of RMSI control block and 2 symbols of RMSI data block.

Figure 10:
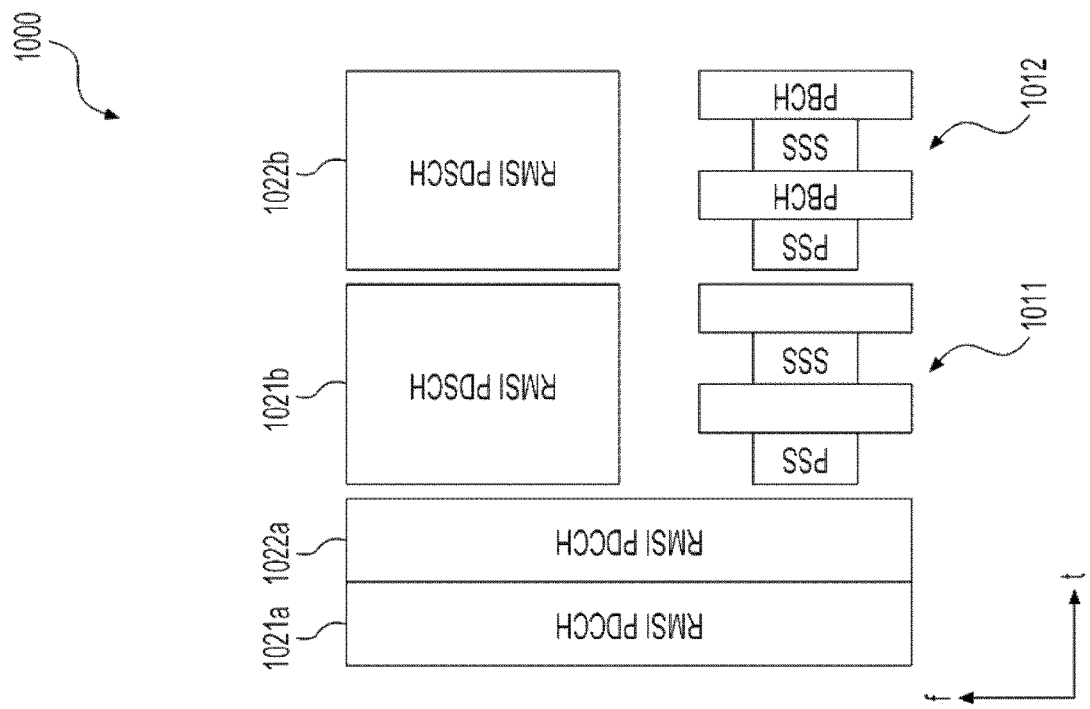
FIG. 10 shows another SS block and RMSI block multiplexing pattern according to an embodiment of the disclosure.

FIG. 10 shows another SS block and RMSI block multiplexing pattern 1000 according to an embodiment of the disclosure. As shown, a sequence of SS blocks 1011-1012 are transmitted each associated with a beam index from #0-#1. The sequence of SS blocks 1011-1012 are time division multiplexed (TDMed) with a sequence of RMSI control blocks 1021a-1022a, and FDMed with a sequence of RMSI data blocks 1021b-1022b. Each RMSI data block 1021b-1022b is scheduled by the respective RMSI control block 1021a-1022a. Each RMSI control block 1021a-1022a is associated with the respective SS block 1011-1012, and can be quasi-co-located (QCLed) with the respective SS block, and transmitted with a same beam as the respective SS block.

In an example, the SS blocks 1011-1022 and the RMSI control or data blocks may have different numerology. For example, the SS blocks 1011-22 is transmitted with a subcarrier spacing of 30 kHz, and the RMSI control or data blocks 1021a-1022a and 102 1b-1022b are transmitted with a subcarrier spacing of 15 kHz.

Figure 11:
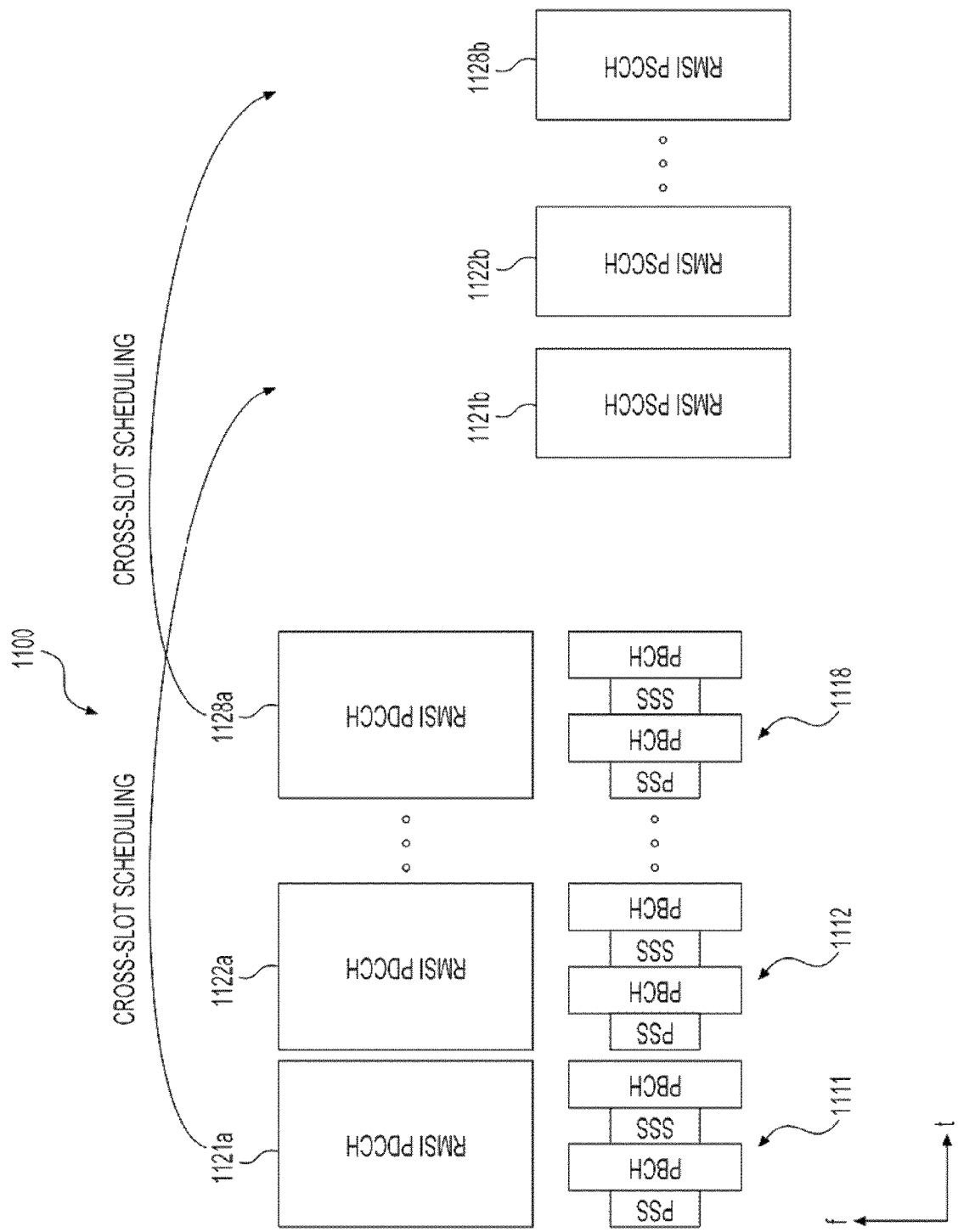
FIG. 11 shows a further SS block and RMSI block multiplexing pattern according to an example of the disclosure.

FIG. 11 shows a further SS block and RMSI block multiplexing pattern 1100 according to an example of the disclosure. As shown, similar to the FIG. 9 example, a sequence of SS blocks 1111-1118 are transmitted each associated with a beam index from #0 to #7. The sequence of blocks 1111-1118 are associated and FDMed with a sequence of RMSI control blocks 1121a-1121a, while associated and TDMed with a sequence of RMSI data blocks 112 1b-1128b. Each RMSI control block (PDCCH) 1121a-1128a schedules each respective RMSI Data block (PDSCH) 1121b-1128b. As the RMSI control block and the respective data block resides in different slots, such a manner of scheduling is referred to as a cross-slot scheduling.

In an example, the SS blocks 1111-1118 and the RMSI control or data blocks 1121a-1128a and 1121b-1128b have different numerology. For example, the SS blocks may be transmitted with a subcarrier spacing of 30 kHz, and the SS control and data blocks are transmitted with a subcarrier spacing of 15 kHz. According to FIG. 7, each SS block may occupy 4 symbols and the corresponding RMSI control block may occupy 2 symbols. The cross slot mechanism enables enough resources residing a distance away from the respective RMSI control block can be employed for delivery of the RMSI data block.

Figure 12:
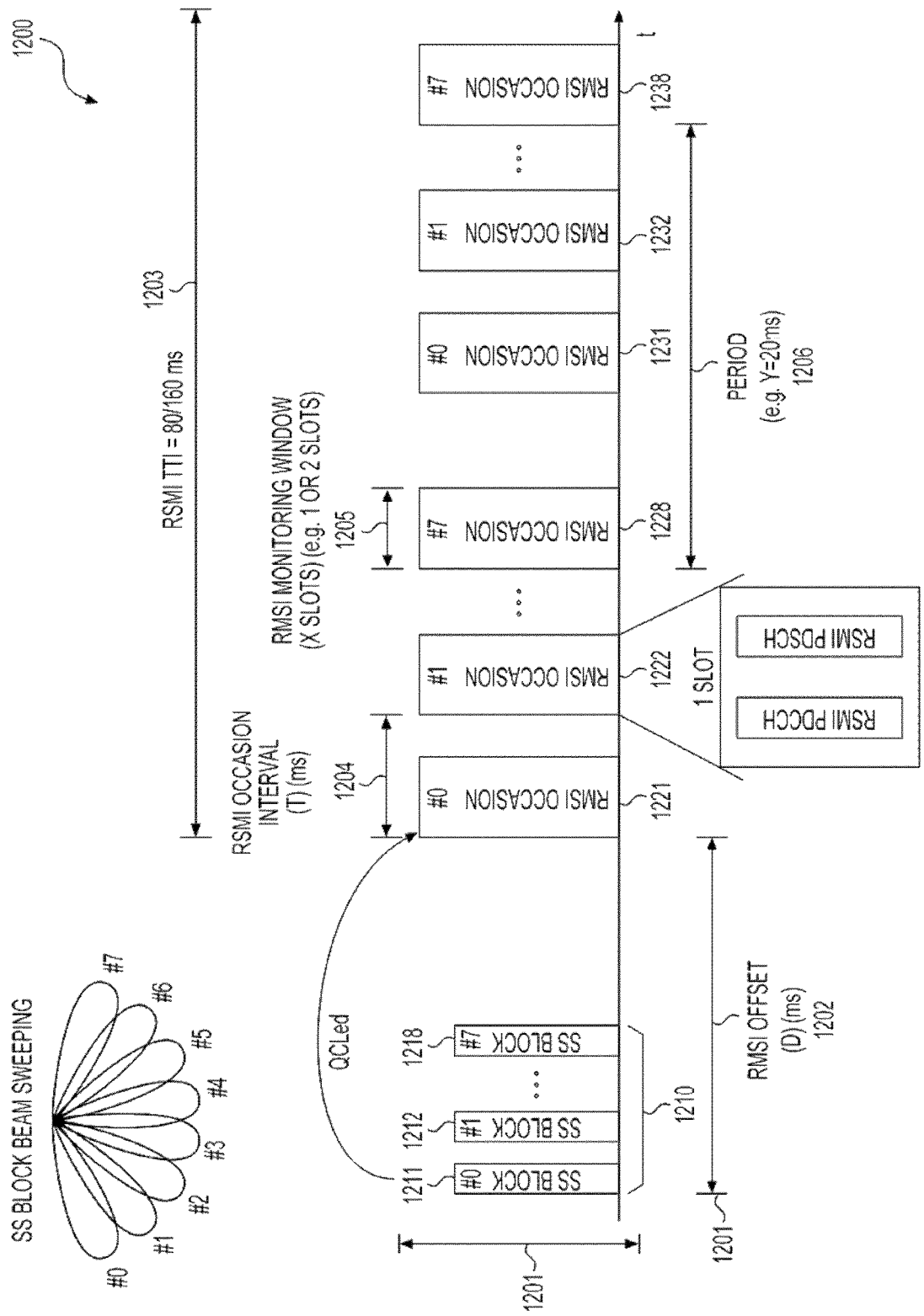
FIG. 12 shows an example configuration for delivery or reception of RMSI in the system 100 according to an example of the disclosure.

FIG. 12 shows an example configuration 1200 for delivery or reception of RMSI in the system 100 according to an example of the disclosure. As shown, an SS block burst set 1210 including a sequence of SS blocks 1211-1218 having beam indexes of #0 to #7 is transmitted from the BS 120 within an initial bandwidth part (BWP) 1201. The initial BWP 120 can be predefined such that the UE 110 can search for SS blocks on the initial BWP in order to perform a cell search process. The sequence of SS blocks 1211-1218 can be transmitted by performing a beam sweeping with transmission beams indexed from #0 to #1.

FIG. 12 also shows a first sequence of RMSI PDCCH monitoring occasions (RMSI occasions) 1221-1228, and a second sequence of RMSI occasions 1231-1238. The sequence of RMSI occasions (e.g., the first or second sequence of RMSI occasions) can be periodically transmitted with an RMSI transmission period 1206 of Y ms. For example, the RMSI transmission period 1206 can be 20 ms in one example. In addition, the RMSI corresponding to the RMSI occasions 1221-1228 and 1231-1238 can have a transmission time interval (TTI) 1203, for example, of 80 or 160 ms.

Each RMSI occasion can be associated with an SS block in one example. For example, the RMSI PDCCH (or corresponding CORESET) carried in the RMSI occasion 1221 can be QCLed with the SS block 1211. Thus, channel properties of channels for transmission of the SS block 1211 and the respective RMSI PDCCH of the RMSI occasion 1221 can be similar Accordingly, each RMSI occasion 1221-1228 is labeled with a beam index the same as the associated SS block in FIG. 12, which indicates the QCLed association between the SS blocks and the respective RMSI PDCCHs of the RMSI occasions.

Each RMSI occasion can have a same size in time domain and last for one or more slots corresponding to a numerology for transmission of the respective RMSI PDCCHs. Based on the number of slots of each RMSI occasion, an RMSI monitoring window 1205 can be defined for monitoring a RMSI PDCCH in each RMSI occasion. For example, the RMSI monitoring window 1205 can last for X slots equal to the number of slots of the RMSI occasion.

In FIG. 12 example, each RMSI occasion corresponds to one SS block, and thus carries one RMSI PDCCH and possibly one RMSI PDSCH. As an example, a one-slot RMSI occasion is shown corresponding to the RMSI occasion 1222. In alternative examples, cross-slot scheduling may be used, and the RMSI PDSCH may not be carried in a same slot as the respective RMSI PDCCH.

FIG. 12 also shows an RMSI occasion interval 1204 (represented as T) between consecutive RMSI occasions. In one example, the sequence of RMSI occasions 1221-1228 or 1231-1238 are evenly distributed in time domain. The RMSI occasion interval 1204 can last for one or more slots corresponding to the numerology for transmission of the respective PDCCHs in different examples. While two consecutive RMSI occasions (e.g., 1221 and 1222) are shown to be a distance away from each other, in alternative example, the RMSI occasion interval 1204 may be equal to the RMSI monitoring window 1205 (that equals elapsed time of one RMSI occasion). Thus, two consecutive RMSI occasions may be adjacent to each other.

FIG. 12 also shows an RMSI offset (represented as D) 1202 indicating a time offset between a timing reference 1207 and a slot carrying the RMSI PDCCH monitoring occasion 1221 at the beginning of the first sequence of the RMSI PDCCH monitoring occasions 1221-1228. In FIG. 12 example, the timing reference 1207 is the start of a slot carrying the first SS block 1211. Accordingly, the RMSI offset 1202 may indicate a timing offset between the slot carrying the first SS block 1211 and the slot carrying the first RMSI occasion 1221 that follows the SS block burst 1210. In other examples, the timing reference 1207 can be different from what is shown in FIG. 12. For example, the timing reference can be a starting of each of a sequence of frames with a certain period. For example, the period can be 20 ms, 40 ms, 80 ms, and the like. For example, the timing reference 1207 can be a starting slot of every 20 ms. Or in other words, the timing reference 1207 is a starting slot of a frame with a system frame number (SFN) that is a multiple of 2 (e.g., SFN mod 2=0). As an SS block burst set may have different period (e.g., 5, 10, 20, 40, 80, or 160 ms), the starting slot corresponding to the timing reference 1207 may not carry an SS block.

In an embodiment, based on the configurations shown in FIG. 12, the UE 110 can determine a timing (a start time) of a first slot of an RMSI occasion during a cell search process. For example, the configuration parameters including the RMSI offset 1202 (D), the RMSI occasion interval 1204 (T) can be carried in a PBCH of an SS block having an index represented as SBI. The UE 110 decodes the PBCH in the SS block to obtain the configuration information, and determines the timing of the RMSI occasion (or referred to as an RMSI timing) associated with the SS block according to the following equation:

$$\text{RMSI Timing (in ms or slot)} = D + SBI*T, \quad (1)$$

where D and T are provided as a number of ms or slots, and the RMSI timing is a start time with respect to the timing reference 1207 (e.g., the slot carrying the first SS block 1211, or a slot not carrying an SS block 1211).

For example, the UE 110 select the SS block 1212 and decode the PBCH of the SS block 1212 to obtain the configuration parameters (D and T) related with RMSI delivery. As the SS block 1212 has an index of #1, the SBI can thus take a value of 1. According to the equation (1), an RMSI timing corresponding to the RMSI occasion 1222 can be determined to be D+T ms or slots with respect to a respective timing reference. For example, the respective timing reference can be a starting slot of every 20 ms. The UE 110 may accordingly monitor a RMSI occasion at the determined RMSI timing with respect to a first starting slot of a first frame with SFN mod 2 =0. If no RMSI PDCCH is detected, the UE 110 may proceed to monitor another RMSI occasion at the determined RMSI timing with respect to a second starting slot of a second frame with SFM mod 2=0.

In one example, the RMSI monitoring window 1205 (X slots or ms) has a same length as the RMSI occasion interval 1204, accordingly, the equation can be transformed to be:

$$\text{RMSI Timing} = D + SBI*X, \quad (2)$$

While in the above examples ms is used as the time unit, it is understood that other time unit (e.g., second) can be used for determining a timing of a RMSI occasion.

In another embodiment, the equations (1) or (2) is further transformed to determine a timing of an RMSI occasion in slots. For example, the RMSI offset (given as D ms) 1202 in slot and the RMSI occasion interval (given as T ms) 1204 in slot can be represented as:

$D*\text{number of slots per ms};$ $T*\text{number of slots per ms}.$

As described with reference to FIG. 4, corresponding to a subcarrier spacing of 15 kHz, 30 kHz, 60 kHz, 120 kHz, or 240 kHz, the respective subframe 420-460 can include 1, 2, 4, 8, or 16 slots. Thus, the RMSI offset in slot and the RMSI occasion interval in slot can be represented as:

$D*2^\mu;$ $T*2^\mu,$ where μ is a numerology index in a range from 0 to 4 corresponding to subcarrier spacings from 15 kHz to 240 kHz, respectively. For example, for μ=3, a ms would count for a number of $2^\mu=8$ slots.

Accordingly, the timing of the RMSI occasion associated with the SS block having index of SBI can be determined according to the following equation:

$$\text{RMSI Timing (in slot)} = D*2^\mu + SBI*T*2^\mu, \quad (3)$$

where D and T are provided as a number of ms, and the timing of the RMSI occasion is a number of slots with respect to the first slot carrying the SS block 1211.

In one example, the timing of the RMSI occasion associated with the SS block having the index of SBI can be determined according to the following equation:

$$\text{RMSI Timing(in slot within a frame)} = (D*2^\mu + SBI*T*2^\mu) \bmod N_{slot}^{frame,\mu}, \quad (4)$$

where $N_{slot}^{frame,\mu}$ represents a number of slots in a frame corresponding to a numerology of index μ, and the timing of the respective RMSI occasion in equation (4) is represented as a number of slots with respect to a start of the frame containing the RMSI occasion.

In an embodiment, the RMSI occasion interval (T) 1204 is configured to be a period of 1 slot (accordingly each RMSI occasion elapses 1 slot). Under such configuration, the timing of the RMSI occasion associated with the SS block having the index of SBI can be determined according to the following equation:

$$\text{RMSI Timing(in slot)} = (D*2^\mu + SBI*T') \bmod N_{slot}^{frame,\mu} \quad (5)$$

$$= (D*2^\mu + SBI) \bmod N_{slot}^{frame,\mu},$$

$$T' = 1 \text{ slot.}$$

In an embodiment, the RMSI offset 1202 can have a length of 0, 2, 5, or 7 ms corresponding to a numerology configuration of subcarrier spacing of 15 or 30 kHz, or a length of 0, 2.5, 5, 7.5 ms corresponding to a numerology configuration of subcarrier spacing of 120 or 240 kHz.

As an example, under a configuration of RMSI occasion interval of T=1 slot, an RMSI offset (D ms) 1202 having a length of 7 ms, a numerology of μ=0 (15 kHz), a timing of an RMSI occasion corresponding to a beam index of SBI=3 would have a length of 10 slots with respect to the slot carrying the first SS block 1211. According to the equation (5) where each frame includes 10 slots ($N_{slot}^{frame,\mu}$ 32 10 slots), the RMSI timing in slot would be 1 slot after the modulo operation, which corresponds to a first slot in a frame following a previous frame carrying the SS block burst set 1210.

In an embodiment, RMSI occasions are configured in a way different from the FIG. 12 example For example, a sequence of RMSI occasions correspond to an SS block burst set including 8 beam indexes from #0 to #7, and accordingly the RMSI occasions have indexes from #0 to #7. Every two consecutive RMSI occasions corresponding to an even index and an odd index (e.g., #0 and #1, #2 and #3, and the like) are arranged to be adjacent to each other, for example, carried in a same slot. In one example, the pair of adjacent RMSI occasions are arranged in the first and second symbols of the respective slot, respectively. In other examples, the pair of adjacent RMSI occasions may be arranged in other symbols in the respective slot.

Under such a configuration, the RMSI occasion interval T is defined to be an interval between two consecutive even-index RMSI occasions or two consecutive odd-index RMSI occasions. For example, T can be an interval between RMSI occasions of #0 and #2, or #1 and #3. Accordingly, for event-indexed or odd-indexed RMSI occasions, a respective RMSI timing of an RMSI occasion can be determined according to the following equation:

$$RMSI\ \text{Timing(in slot)} = D + \left\lfloor SBI * \left(\frac{1}{2}\right) \right\rfloor * T, \quad (6)$$

where $\lfloor\ \rfloor$ represents a floor operator, and D and SBI are similarly defined as in the FIG. 12 example.

As seen above, equation (6) is similar to equation (1), however, the SBI in equation (1) is replaced with $$\left\lfloor SBI * \left(\frac{1}{2}\right) \right\rfloor,$$

and RMSI occasion interval T refers to an interval between two consecutive even- or odd-indexed RMSI occasions. In a similar way, the expressions (2)-(5) can be transformed to be applicable for the above configuration.

Figure 13:
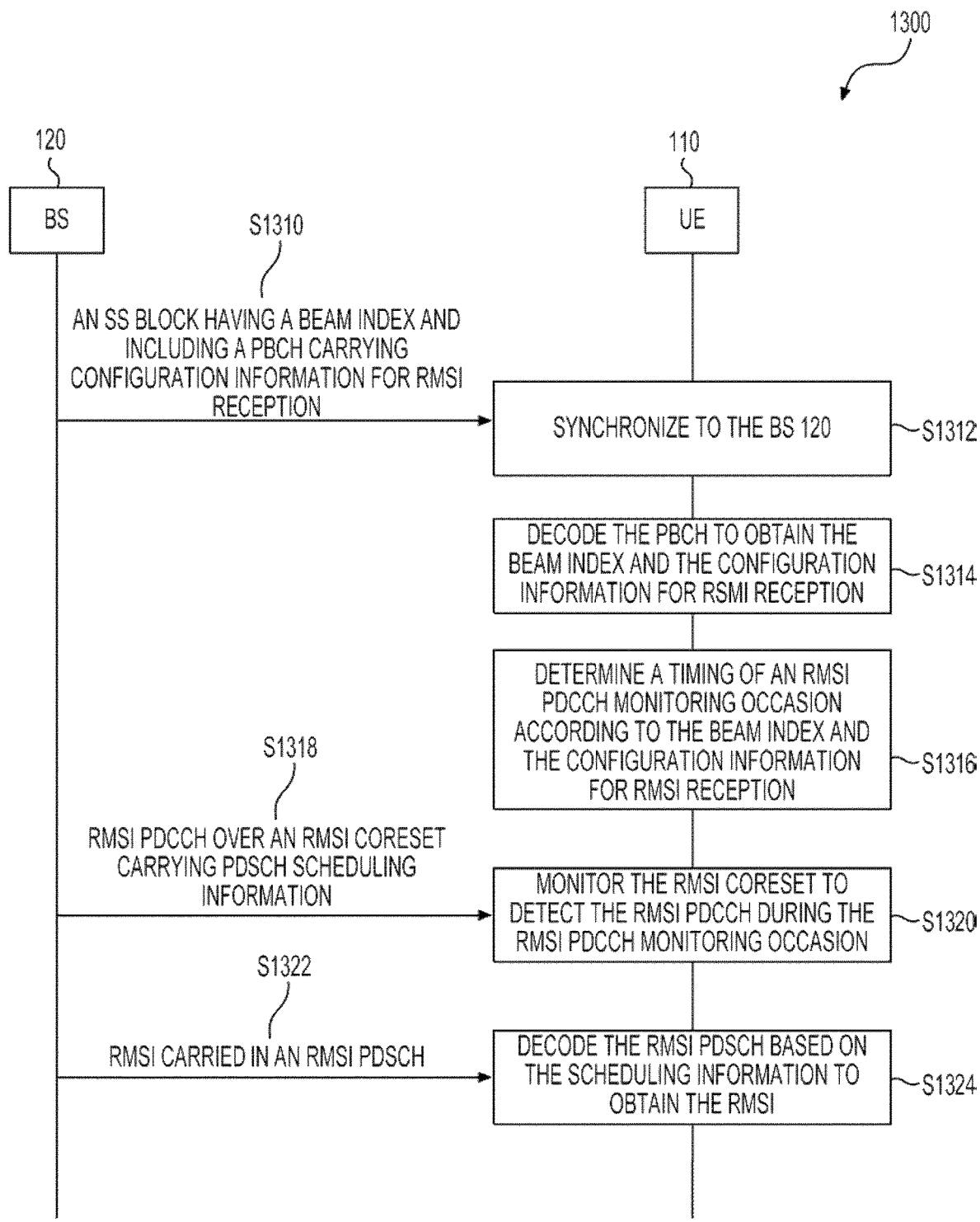
FIG. 13 shows an RMSI delivery or reception process according to an embodiment of the disclosure.

FIG. 13 shows an RMSI delivery or reception process 1300 according to an embodiment of the disclosure. The process 1300 can be performed by the BS 120 and the UE 110 in the system 100 in FIG. 1 example. During the process 1300, a timing of a slot corresponding to an RMSI PDCCH monitoring occasion is determined based on configuration information provided by a PBCH in an SS block. The RMSI PDCCH monitoring occasion can be associated with the SS block. The configuration information can include an RMSI offset (D), and an RMSI occasion interval (T). By performing the process 1300, respective RMSI can be received from the BS 120 at the UE 110. The process 1300 starts from S1310.

At S1310, the SS block is transmitted from the BS 120 to the UE 110. The SS block can be one of an SS block burst set that is transmitted with a beam sweeping to cover the cell 128. Each SS block in the SS block burst set is associated with a beam index as an identity. Each SS block in the SS burst includes a PBCH that carries the beam index as well as configuration information for RMSI reception. The configuration information for RMSI reception may include or indicate configuration information of RMSI PDCCH monitoring occasions (RMSI occasions). In one example, each of the RMSI occasions is associated with one SS block in the SS block burst set.

The configuration information of RMSI occasions can include the RMSI offset (D) between a timing reference (e.g., a starting slot of every 20 ms) and a slot carrying the first RMSI occasion of the sequence of RMSI occasions, and the RMSI interval (T) between RMSI occasions. In different examples, the RMSI offset (D) or the RMSI interval (T) can be represented as a number of time units (e.g., ms) or as a number of slots.

In one example, the configuration information for RMSI reception in the PBCH may use an index corresponding to an entry in a table to indicate the respective configuration information of RMSI occasions. For example, different entries of the table may correspond to different configurations, such as configurations of frequency bands, different numerologies, RMSI occasion and SS block multiplexing patterns, and the like. The UE 110 decodes the PBCH to obtain such an entry index and consults the table to obtain the respective configuration information of RMSI occasions.

In addition, the configuration information for RMSI reception may include additional configuration information necessary for reception of RMSI. For example, the additional configuration information may specify a size of a CORESET carrying the respective PDCCH, a location of the CORESET in time and frequency grid, a numerology of the CORESET, and the like Similarly, that additional configuration information may be organized into the table as described above, and a respective entry index is used in the PBCH configuration information to indicate that additional configuration information.

At S1312, the UE 110 receives the SS block transmitted at S1310 and accordingly synchronizes to the BS 120. For example, the SS block carries a PSS and a SSS. By detecting the PSS and SSS, the UE 110 can tune to be synchronized with the downlink transmission of the BS 120.

At S1314, the UE 110 decodes the PBCH of the SS block transmitted at S1310 to obtain the beam index of the SS block and the configuration information for RMSI reception that includes or indicate the configuration information of RMSI occasions.

At S1316, the UE 110 determines a timing of an RMSI PDCCH monitoring occasion based on the beam index and the configuration for RMSI reception obtained at S1314. For example, one of the expressions (1)-(5) described with reference to FIG. 12, and the expression (6) and respective transformed expressions corresponding to expressions (2)-(5), can be used to determine the timing of the RMSI PDCCH monitoring occasion.

At S1318, the BS 120 transmits an RMSI PDCCH over an RMSI CORESET. The RMSI PDCCH carries scheduling information of a PDSCH carrying RMSI to be received by the UE 110. The RMSI CORESET may be included in a slot included in the RMSI PDCCH monitoring occasion the timing of which is determined at S1316, such that the UE 110 may capture the respective RMSI PDCCH in the RMSI CORESET by monitoring the RMSI CORESET during the RMSI monitoring occasion determined at S1316.

At S1320, the UE 110 monitors the RMSI CORESET to detect the RMSI PDCCH during the RMSI PDCCH monitoring occasion based on the timing determined at S1318. As a result, the scheduling information of the respective RMSI PDSCH can be obtained.

At S1322, the RMSI is transmitted over the RMSI PDSCH from the BS 120 to the UE 110.

At S1324, the UE 110 detects and decodes the RMSI PDSCH based on the scheduling information obtained at S1320. As a result, the RMSI carried over the RMSI PDSCH can be obtained at the UE 110. The process 1300 terminates thereafter.

Figure 14:
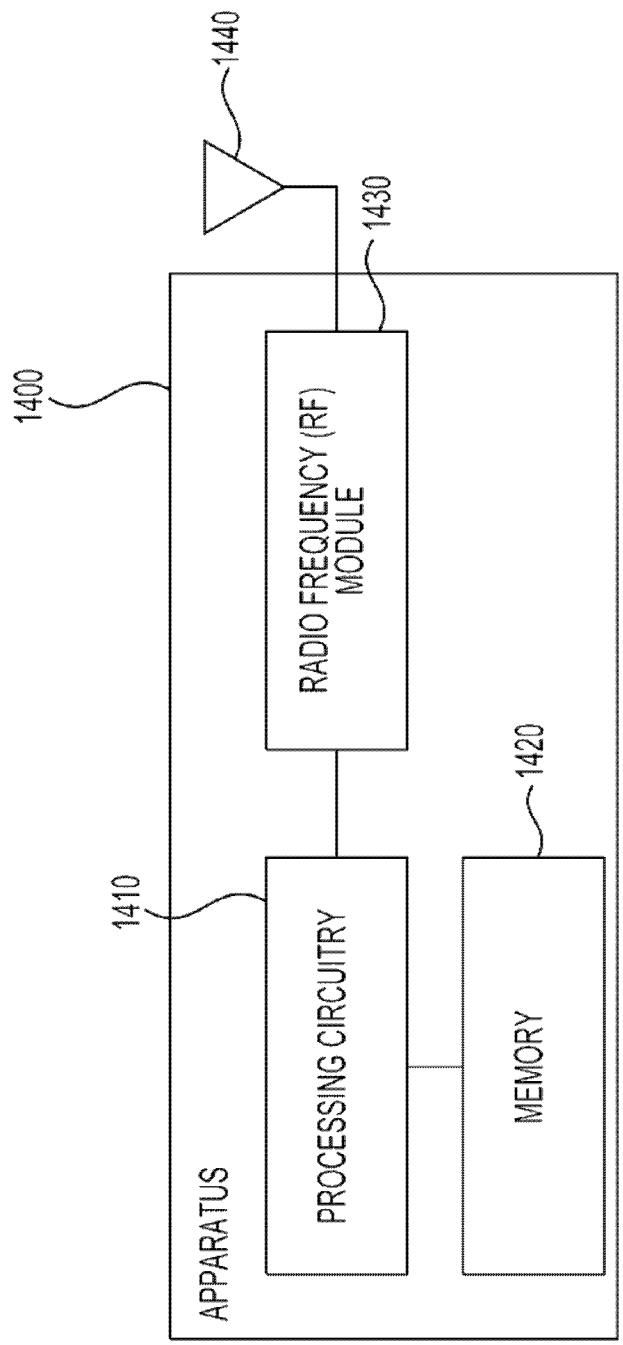
FIG. 14 shows an exemplary apparatus according to embodiments of the disclosure.

FIG. 14 shows an exemplary apparatus 1400 according to embodiments of the disclosure. The apparatus 1400 can be configured to perform various functions in accordance with one or more embodiments or examples described herein. Thus, the apparatus 1400 can provide means for implementation of techniques, processes, functions, components, systems described herein. For example, the apparatus 1400 can be used to implement functions of the UE 110 or the BS 120 in various embodiments and examples described herein. The apparatus 1400 can be a general purpose computer in some embodiments, and can be a device including specially designed circuits to implement various functions, components, or processes described herein in other embodiments. The apparatus 1400 can include processing circuitry 1410, a memory 1420, and a radio frequency (RF) module 1430.

In various examples, the processing circuitry 1410 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1410 can be a central processing unit (CPU) configured to execute program instructions to perform various functions and processes described herein. Accordingly, the memory 1420 can be configured to store program instructions. The processing circuitry 1410, when executing the program instructions, can perform the functions and processes. The memory 1420 can further store other programs or data, such as operating systems, application programs, and the like. The memory 1420 can include a read only memory (ROM), a random access memory (RAM), a flash memory, a solid state memory, a hard disk drive, an optical disk drive, and the like.

The RF module 1430 receives processed data signal from the processing circuitry 1410 and transmits the signal in a beam-formed wireless communication network via an antenna 1440, or vice versa. The RF module 1430 can include a digital to analog convertor (DAC), an analog to digital converter (ADC), a frequency up convertor, a frequency down converter, filters, and amplifiers for reception and transmission operations. The RF module 1430 can include multi-antenna circuitry (e.g., analog signal phase/amplitude control units) for beamforming operations. The antenna 1440 can include one or more antenna arrays.

The apparatus 1400 can optionally include other components, such as input and output devices, additional or signal processing circuitry, and the like. Accordingly, the apparatus 1400 may be capable of performing other additional functions, such as executing application programs, and processing alternative communication protocols.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
receiving a synchronization signal block (SS block) from a base station by a user equipment (UE) in a wireless communication system, wherein
the SS block includes a physical broadcast channel (PBCH) carrying a beam index (SBI),
the PBCH provides configuration information of a sequence of remaining minimum system information (RMSI) physical downlink control channel (PDCCH) monitoring occasions,
each of the RMSI PDCCH monitoring occasions is associated with one of a sequence of SS blocks in an SS block burst set, and
the configuration information of RMSI PDCCH monitoring occasion indicates an RMSI offset (D) and an RMSI interval (T), the RMSI offset (D) representing an offset between a timing reference and a slot carrying a first RMSI PDCCH monitoring occasion at a beginning of the sequence of the RMSI PDCCH monitoring occasions, and the RMSI interval (T) representing a time interval between two adjacent RMSI PDCCH monitoring occasions in the sequence of RMSI PDCCH monitoring occasions;
decoding the PBCH of the SS block to obtain the SBI of the SS block, the RMSI offset (D), and the RMSI interval (T);
determining, by processing circuitry of the UE, a timing, with respect to the timing reference, of an RMSI PDCCH monitoring occasion in the sequence of RMSI PDCCH monitoring occasions based on the RMSI offset (D), a numerology index for transmission of RMSI PDCCHs carried in the RMSI PDCCH monitoring occasions, and a multiplication of the SBI and the RMSI interval (T); and
configuring the UE to monitor an RMSI control resource set (CORESET) according to the determined timing of the RMSI PDCCH monitoring occasion to detect an RMSI PDCCH.

2. The method of claim 1, wherein the timing reference is a starting of each of a sequence of frames transmitted with a period.

3. The method of claim I, further comprising:
monitoring, by the processing circuitry of the UE, the RMSI CORESET carrying the RMSI PDCCH during the RMSI PDCCH monitoring occasion according to the determined timing of the RMSI PDCCH monitoring occasion to detect the RMSI PDCCH, the RMSI PDCCH carrying scheduling information of a physical downlink shared channel (PDSCH) carrying RMSI; and
decoding the RMSI PDSCH according to the scheduling information to obtain the RMSI.

4. The method of claim I, further comprising:
determining the timing of the RMSI PDCCH monitoring occasion with respect to the timing reference according to an equation of:

$$\text{the timing of the RMSI PDCCH monitoring occasion in slot} = D*2^\mu + SBI*T*2^\mu,$$

wherein the RMSI offset (D) and the RMSI interval (T) are provided in a unit of millisecond (ms), and $\mu$ is the numerology index indicating one of a predetermined set of different subcarrier spacings for the transmission of RMSI PDCCHs carried in the RMSI PDCCH monitoring occasions such that $2^\mu$ indicating a number of slots per millisecond.

5. The method of claim 1, further comprising:
determining the timing of the RMSI PDCCH monitoring occasion with respect to a start time of a frame containing the RMSI PDCCH monitoring occasion according to an equation of:

the timing of the RMSI PDCCH monitoring occasion in slot within the frame $=(D*2^\mu+SBI*T*2^\mu)$ mod $N_{slot}^{frame,\mu}$, wherein the RMSI offset (D) and the RMSI interval (T) are provided in a unit of millisecond (ms), μ is the numerology index indicating one of a predetermined set of different subcarrier spacings for the transmission of RMSI PDCCHs carried in the RMSI PDCCH monitoring occasions such that $2^\mu$ indicating a number of slots per millisecond, and $N_{slot}^{frame,\ \mu}$ represents a number of slots in the frame corresponding to the numerology index μ.

6. The method of claim 5, further comprising:
determining the timing of the RMSI PDCCH monitoring occasion with respect to the start time of the frame containing the RMSI PDCCH monitoring occasion according to equations of:

the timing of the RMSI PDCCH monitoring occasion in slot within the frame $= (D*2^\mu + SBI*T')\mathrm{mod}\ N_{slot}^{frame,\mu}$ $= (D*2^\mu + SBI)\mathrm{mod}\ N_{slot}^{frame,\mu}$, and $T' = 1$ slot, wherein the RMSI interval (T) equals one slot (T being set to T'=1 slot) corresponding to the numerology index μ.

7. The method of claim 1, wherein the sequence of RMSI physical downlink control channel (PDCCH) monitoring occasions each include an RMSI PDCCH.

8. The method of claim 1, wherein the RMSI interval (T) includes one or more slots corresponding to a numerology of the sequence of RMSI physical downlink control channel (PDCCH) monitoring occasions.

9. The method of claim 1, wherein the sequence of RMSI physical downlink control channel (PDCCH) monitoring occasions each include one or more slots corresponding to a numerology of the sequence of RMSI physical downlink control channel (PDCCH) monitoring occasions.

10. The method of claim 1, wherein the RMSI offset (D) and the RMSI interval (T) are provided in a unit of slot.

11. A method, comprising:
transmitting a synchronization signal block (SS block) by a base station to a user equipment (UE) in a wireless communication system, wherein
the SS block includes a physical broadcast channel (PBCH) carrying a beam index (SBI),
the PBCH provides configuration information of a sequence of remaining minimum system information (RMSI) physical downlink control channel (PDCCH) monitoring occasions,
each of the RMSI PDCCH monitoring occasions is associated with one of a sequence of SS blocks in an SS block burst set, and
the configuration information of RMSI PDCCH monitoring occasions indicates an RMSI offset (D) and an RMSI interval (T), the RMSI offset (D) representing an offset between a timing reference and a slot carrying a first RMSI PDCCH monitoring occasion at a beginning of the sequence of the RMSI PDCCH monitoring occasions, and the RMSI interval (T) representing a time interval between two adjacent RMSI PDCCH monitoring occasions in the sequence of RMSI PDCCH monitoring occasions; and
transmitting, by the base station, an RMSI PDCCH over an RMSI control resource set (CORESET) during an RMSI PDCCH monitoring occasion in the sequence of RMSI PDCCH monitoring occasions, the RMSI PDCCH monitoring occasion being determinable by the UE based on the RMSI offset (D), a numerology index for transmission of RMSI PDCCHs carried in the RMSI PDCCH monitoring occasions, and a multiplication of the SBI and the RMSI interval (T).

12. The method of claim 11, further comprising:
transmitting, by the base station, the RMSI PDCCH carrying scheduling information of a physical downlink shared channel (PDSCH) carrying RMSI; and
transmitting the RMSI PDSCH carrying the RMSI.

13. The method of claim 11, wherein the sequence of RMSI physical downlink control channel (PDCCH) monitoring occasions each include an RMSI PDCCH.

14. The method of claim 11, wherein the RMSI interval (T) includes one or more slots corresponding to a numerology of the sequence of RMSI physical downlink control channel (PDCCH) monitoring occasions.

15. The method of claim 11, wherein the sequence of RMSI physical downlink control channel (PDCCH) monitoring occasions each include one or more slots corresponding to a numerology of the sequence of RMSI physical downlink control channel (PDCCH) monitoring occasions.

16. A user equipment (UE), comprising circuitry configured to:
receive a synchronization signal block (SS block) from a base station in a wireless communication system, wherein
the SS block includes a physical broadcast channel (PBCH) carrying a beam index (SBI),
the PBCH provides configuration information of a sequence of remaining minimum system information (RMSI) physical downlink control channel (PDCCH) monitoring occasions,
each of the RMSI PDCCH monitoring occasions is associated with one of a sequence of SS blocks in an SS block burst set, and
the configuration information of RMSI PDCCH monitoring occasion indicates an RMSI offset (D) and an RMSI interval (T), the RMSI offset (D) representing an offset between a timing reference and a slot carrying a first RMSI PDCCH monitoring occasion at a beginning of the sequence of the RMSI PDCCH monitoring occasions, and the RMSI interval (T) representing a time interval between two adjacent RMSI PDCCH monitoring occasions in the sequence of RMSI PDCCH monitoring occasions;
decode the PBCH of the SS block to obtain the SBI of the SS block, the RMSI offset (D), and the RMSI interval (T);
determine a timing, with respect to the timing reference, of an RMSI PDCCH monitoring occasion in the sequence of RMSI PDCCH monitoring occasions based on the RMSI offset (D), a numerology index for transmission of RMSI PDCCHs carried in the RMSI PDCCH monitoring occasions, and a multiplication of the SBI and the RMSI interval (T); and configure the UE to monitor an RMSI control resource set (CORESET) according to the determined timing of the RMSI PDCCH monitoring occasion to detect an RMSI PDCCH.

17. The UE of claim 16, wherein the timing reference is a starting of each of a sequence of frame transmitted with a period.

18. The UE of claim 16, wherein the circuitry is further configured to:
determine the timing of the RMSI PDCCH monitoring occasion with respect to the timing reference according to an equation of:

the timing of the RMSI PDCCH monitoring occasion in slot $=D*2^\mu+SBI*T*2^\mu$, wherein the RMSI offset (D) and the RMSI interval (T) are provided in a unit of millisecond (ms), and µ is the numerology index indicating one of a predetermined set of different subcarrier spacings for the transmission of RMSI PDCCHs carried in the RMSI PDCCH monitoring occasions such that $2^\mu$ indicating a number of slots per millisecond.

19. The UE of claim 16, wherein the circuitry is further configured to:
determine the timing of the RMSI PDCCH monitoring occasion with respect to a start time of a frame containing the RMSI PDCCH monitoring occasion according to an equation of:

the timing of the RMSI PDCCH monitoring occasion in slot within the frame $=(D*2^\mu+SBI*T*2^\mu)$ mod $N_{slot}^{frame,\mu}$, wherein the RMSI offset (D) and the RMSI interval (T) are provided in a unit of millisecond (ms), µ is the numerology index indicating one of a predetermined set of different subcarrier spacings for the transmission of RMSI PDCCHs carried in the RMSI PDCCH monitoring occasions such that $2^\mu$ indicating a number of slots per millisecond, and $N_{slot}^{frame,\mu}$ represents a number of slots in the frame corresponding to the numerology index µ.

20. The UE of claim 19, wherein the circuitry is further configured to:
determine the timing of the RMSI PDCCH monitoring occasion with respect to the start time of the frame containing the RMSI PDCCH monitoring occasion according to equations of:
the timing of the RMSI PDCCH monitoring occasion in slot within the frame $$= (D*2^\mu + SBI*T')\bmod N_{slot}^{frame,\mu}$$
$$= (D*2^\mu + SBI)\bmod N_{slot}^{frame,\mu}, \text{ and}$$
$$T' = 1 \text{ slot,}$$

wherein the RMSI interval (T) equals one slot (T being set to T'=1 slot) corresponding to the numerology index µ.

21. The UE of claim 16, wherein the sequence of RMSI physical downlink control channel (PDCCH) monitoring occasions each include an RMSI PDCCH.

22. A method, comprising:
receiving a synchronization signal block (SS block) from a base station by a user equipment (UE) in a wireless communication system, wherein
the SS block includes a physical broadcast channel (PBCH) carrying a beam index (SBI), the PBCH provides configuration information of a sequence of remaining minimum system information (RMSI) physical downlink control channel (PDCCH) monitoring occasions,
each of the RMSI PDCCH monitoring occasions is associated with one of a sequence of SS blocks in an SS block burst set,
each of the RMSI PDCCH monitoring occasions has an index corresponding to a beam index of the respective SS block in the SS block burst set, and
the configuration information of RMSI PDCCH monitoring occasion indicates an RMSI offset (D) and an RMSI interval (T), the RMSI offset (D) representing an offset between a timing reference and a slot carrying a first RMSI PDCCH monitoring occasion at a beginning of the sequence of the RMSI PDCCH monitoring occasions, and the RMSI interval (T) representing a time interval between two consecutive even-indexed or odd-indexed RMSI PDCCH monitoring occasions in the sequence of RMSI PDCCH monitoring occasions;
decoding the PBCH of the SS block to obtain the SBI of the SS block, the RMSI offset (D), and the RMSI interval (T);
deteii lining, by processing circuitry of the UE, a timing with respect to the timing reference of an RMSI PDCCH monitoring occasion in the sequence of RMSI PDCCH monitoring occasions based on the RMSI offset (D), a numerology index for transmission of RMSI PDCCHs carried in the RMSI PDCCH monitoring occasions, and a multiplication of the SBI and the RMSI interval (T); and
configuring the UE to monitor an RMSI control resource set (CORESET) according to the determined timing of the RMSI PDCCH monitoring occasion to detect an RMSI PDCCH.

23. The method of claim 22, wherein the timing reference is a starting of each of a sequence of frames transmitted with a period.

24. The method of claim 22, further comprising:
determining the timing of the RMSI PDCCH monitoring occasion with respect to the timing reference according to an equation of:

the timing of the RMSI PDCCH monitoring occasion in slot $$= D^*2^\mu + \left\lfloor SBI*\left(\frac{1}{2}\right)\right\rfloor *T*2^\mu,$$

wherein the RMSI offset (D) and the RMSI interval (T) are provided in a unit of millisecond (ms), and µ is the numerology index indicating one of a predetermined set of different subcarrier spacings for the transmission of RMSI PDCCHs carried in the RMSI PDCCH monitoring occasions such that $2^\mu$ indicating a number of slots per millisecond.

25. The method of claim 22, further comprising:
deteimining the timing of the RMSI PDCCH monitoring occasion with respect to a start time of a frame containing the RMSI PDCCH monitoring occasion according to an equation of:

the timing of the RMSI PDCCH monitoring occasion in slot within the frame $$= \left(D * 2^\mu + SBI * \left\lfloor SBI * \left(\frac{1}{2}\right)\right\rfloor * 2^\mu\right) \bmod N_{slot}^{frame,\mu},$$

wherein the RMSI offset (D) and the RMSI interval (T) are provided in a unit of millisecond (ms), $\mu$ is the numerology index indicating one of a predetermined set of different subcarrier spacings for the transmission of RMSI PDCCHs carried in the RMSI PDCCH monitoring occasions such that $2^\mu$ indicating a number of slots per millisecond, and $N_{slot}^{frame,\mu}$ represents a number of slots in the frame corresponding to the numerology index $\mu$.

26. The method of claim 25, further comprising:

determining the timing of the RMSI PDCCH monitoring occasion with respect to the start time of the frame containing the RMSI PDCCH monitoring occasion according to equations of:

the timing of the RMSI PDCCH monitoring occasion in slot within the frame $$= \left(D^* 2^\mu + \left\lfloor SBI * \left(\frac{1}{2}\right)\right\rfloor * T'\right) \bmod N_{slot}^{frame,\mu}$$

$$= \left(D^* 2^\mu + \left\lfloor SBI * \left(\frac{1}{2}\right)\right\rfloor\right) \bmod N_{slot}^{frame,\mu}, \text{ and}$$

$$T' = 1 \text{ slot},$$

wherein the RMSI interval (T) equals one slot (T being set to T'=1 slot) corresponding to the numerology index $\mu$.

* * * * *